US010753913B2

(12) United States Patent
Tipler

(10) Patent No.: US 10,753,913 B2
(45) Date of Patent: Aug. 25, 2020

(54) CHROMATOGRAPHY SYSTEMS WITH MOBILE PHASE GENERATORS

(71) Applicant: Andrew Tipler, Trumbull, CT (US)

(72) Inventor: Andrew Tipler, Trumbull, CT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 0 days.

(21) Appl. No.: 15/194,982

(22) Filed: Jun. 28, 2016

(65) Prior Publication Data
US 2017/0038347 A1   Feb. 9, 2017

Related U.S. Application Data

(60) Provisional application No. 62/186,759, filed on Jun. 30, 2015.

(51) Int. Cl.
*G01N 30/02* (2006.01)
*G01N 30/32* (2006.01)
*G01N 30/26* (2006.01)
*C25B 1/10* (2006.01)
*C25B 9/08* (2006.01)
*G01N 30/68* (2006.01)
(Continued)

(52) U.S. Cl.
CPC ............... *G01N 30/32* (2013.01); *C25B 1/10* (2013.01); *C25B 9/08* (2013.01); *G01N 30/26* (2013.01); *G01N 30/66* (2013.01); *G01N 30/68* (2013.01); *G01N 2030/0095* (2013.01); *G01N 2030/025* (2013.01); *G01N 2030/324* (2013.01); *G01N 2030/326* (2013.01); *G01N 2030/685* (2013.01); *Y02E 60/366* (2013.01)

(58) Field of Classification Search
CPC .. G01N 2030/025; G01N 30/68; G01N 30/02; G01N 30/16; G01N 30/7206; G01N 1/40; G01N 30/66
See application file for complete search history.

(56) References Cited

U.S. PATENT DOCUMENTS 2,991,158 A * 7/1961 Harley ................... G01N 30/68
422/54
3,589,171 A * 6/1971 Haley ..................... G01N 1/40
250/288
(Continued)

FOREIGN PATENT DOCUMENTS

WO      9316790      9/1993
WO      9924829      5/1999
(Continued)

OTHER PUBLICATIONS

IPRP for PCT/US16/39758 dated Oct. 19, 2016.
(Continued)

*Primary Examiner* — David A. Rogers
(74) *Attorney, Agent, or Firm* — Rhodes IP PLC; Christopher R Rhodes

(57) ABSTRACT

Certain configurations of a gas chromatography system comprising an internal gas generator are described. In some instances, the gas chromatography system may comprise an internal hydrogen generator to provide hydrogen gas to a chromatography column for separation of analyte species. In certain examples, the gas chromatography system can be operated without any external gas inputs.

26 Claims, 23 Drawing Sheets

(51) Int. Cl.
   *G01N 30/00*         (2006.01)
   *G01N 30/66*         (2006.01)

(56)         References Cited

U.S. PATENT DOCUMENTS

| | | | |
|---|---|---|---|
| 3,690,835 A * | 9/1972 | Lovelock | G01N 27/42 |
| | | | 205/354 |
| 3,835,019 A | 9/1974 | Lovelock | |
| 3,858,435 A * | 1/1975 | Stevens | G01N 30/28 |
| | | | 422/89 |
| 4,181,613 A * | 1/1980 | Welsh | B01D 15/08 |
| | | | 210/179 |
| 4,670,220 A | 6/1987 | Wells | |
| 4,869,876 A * | 9/1989 | Arfman | G01N 30/30 |
| | | | 422/89 |
| 5,037,518 A * | 8/1991 | Young | C25B 1/10 |
| | | | 204/228.5 |
| 5,142,143 A * | 8/1992 | Fite | G01M 3/202 |
| | | | 250/281 |
| 5,281,256 A | 1/1994 | Sacks | |
| 5,611,846 A * | 3/1997 | Overton | G01N 30/64 |
| | | | 73/23.36 |
| 5,656,170 A * | 8/1997 | Henderson | G01N 30/30 |
| | | | 210/198.2 |
| 5,807,426 A * | 9/1998 | Ohtsuki | G01N 30/30 |
| | | | 73/23.25 |
| 5,811,059 A | 9/1998 | Genovese | |
| 5,830,262 A * | 11/1998 | Marchini | G01N 30/30 |
| | | | 96/105 |
| 5,933,357 A | 8/1999 | Tipler | |
| 5,958,246 A | 9/1999 | Tipler | |
| 6,293,995 B2 | 9/2001 | Wilson | G01N 30/28 |
| | | | 95/127 |
| 6,402,813 B2 | 6/2002 | Monereau | |
| 6,494,939 B1 | 12/2002 | Tipler | |
| 6,514,316 B1 * | 2/2003 | Gaisford | G01N 30/30 |
| | | | 95/87 |
| 6,627,454 B2 * | 9/2003 | Amirav | G01N 30/68 |
| | | | 422/89 |
| 6,645,773 B2 | 11/2003 | Tipler | |
| 6,652,625 B1 | 11/2003 | Tipler | |
| 6,814,785 B2 | 11/2004 | Tipler | |
| 6,974,495 B2 | 12/2005 | Tipler | |
| 7,013,737 B2 | 3/2006 | Prohaska | |
| 7,111,494 B2 | 9/2006 | Tipler | |
| 7,168,296 B2 | 1/2007 | Tipler | |
| 7,219,532 B2 | 5/2007 | Tipler | |
| 7,237,430 B2 | 7/2007 | Prohaska | |
| 7,247,189 B2 | 7/2007 | Seeley | |
| 7,267,709 B2 | 9/2007 | Tipler | |
| 7,284,410 B2 | 10/2007 | Tipler | |
| 7,311,757 B2 | 12/2007 | Tipler | |
| 7,384,453 B2 * | 6/2008 | Bostrom | G01N 30/32 |
| | | | 73/23.42 |
| 7,422,625 B2 | 9/2008 | Tipler | |
| 7,459,313 B2 | 12/2008 | Tipler | |
| 7,468,095 B2 | 12/2008 | Tipler | |
| 7,534,286 B2 | 5/2009 | Tipler | |
| 7,552,618 B2 | 6/2009 | Tipler | |
| 7,572,319 B2 | 8/2009 | Tipler | |
| 7,662,630 B2 | 2/2010 | Tipler | |
| 7,691,181 B2 | 4/2010 | Tipler | |
| 7,709,267 B2 | 5/2010 | Tipler | |
| 7,824,478 B2 | 11/2010 | Tipler | |
| 8,017,081 B2 | 9/2011 | Tipler | |
| 8,303,694 B2 | 11/2012 | Tipler | |
| 8,499,614 B2 * | 8/2013 | Calleri | G01N 30/20 |
| | | | 422/54 |
| 8,776,576 B2 * | 7/2014 | Okada | G01N 30/28 |
| | | | 73/23.35 |
| 9,125,953 B2 * | 9/2015 | Roewer | A61K 9/0019 |
| 9,389,207 B2 * | 7/2016 | Bae | G01N 30/02 |
| 10,161,920 B2 * | 12/2018 | Hassan | G01N 29/022 |
| 2001/0037674 A1 * | 11/2001 | Petro | B01D 15/08 |
| | | | 73/61.52 |
| 2002/0054832 A1 | 5/2002 | Amirav | |
| 2002/0134173 A1 | 9/2002 | Lindgren | |
| 2002/0157483 A1 | 10/2002 | Lo | |
| 2002/0166364 A1 * | 11/2002 | Lechner-Fish | G01N 30/32 |
| | | | 73/23.42 |
| 2003/0113538 A1 | 6/2003 | Tom | |
| 2003/0156987 A1 | 8/2003 | Tipler | |
| 2003/0164312 A1 | 9/2003 | Prohaska | |
| 2004/0014232 A1 | 1/2004 | Tipler | |
| 2004/0016341 A1 | 1/2004 | Tipler | |
| 2005/0039602 A1 | 2/2005 | Tipler | |
| 2005/0180893 A1 | 8/2005 | Handly | |
| 2005/0193802 A1 | 9/2005 | Tipler | |
| 2005/0210957 A1 | 9/2005 | Tipler | |
| 2005/0258088 A1 * | 11/2005 | Botelho | G01N 30/30 |
| | | | 210/198.2 |
| 2005/0284209 A1 | 12/2005 | Tipler | |
| 2006/0016245 A1 | 1/2006 | Tipler | |
| 2006/0024504 A1 | 2/2006 | Tipler | |
| 2006/0075802 A1 | 4/2006 | Prohaska | |
| 2006/0094118 A1 | 5/2006 | Tipler | |
| 2006/0099716 A1 | 5/2006 | Tipler | |
| 2006/0099718 A1 | 5/2006 | Tipler | |
| 2006/0123883 A1 * | 6/2006 | Miyagawa | G01N 30/466 |
| | | | 73/23.37 |
| 2006/0245975 A1 | 11/2006 | Tipler | |
| 2006/0260383 A1 | 11/2006 | Tipler | |
| 2006/0263901 A1 | 11/2006 | Tipler | |
| 2006/0278076 A1 | 12/2006 | Tipler | |
| 2007/0068385 A1 | 3/2007 | Tipler | |
| 2007/0071638 A1 | 3/2007 | Kraiczek | |
| 2007/0074766 A1 | 4/2007 | Klee | |
| 2007/0125233 A1 * | 6/2007 | Bostrom | G01N 30/32 |
| | | | 96/101 |
| 2007/0224693 A1 * | 9/2007 | Prest | G01N 30/34 |
| | | | 436/161 |
| 2007/0261474 A1 | 11/2007 | Tipler | |
| 2007/0266858 A1 * | 11/2007 | Alm | G01N 30/463 |
| | | | 96/105 |
| 2007/0295057 A1 | 12/2007 | Tipler | |
| 2008/0041137 A1 | 2/2008 | Tipler | |
| 2008/0098887 A1 | 5/2008 | Tipler | |
| 2008/0105033 A1 | 5/2008 | Tipler | |
| 2008/0121016 A1 * | 5/2008 | Shah | G01N 30/88 |
| | | | 73/23.42 |
| 2009/0000481 A1 | 1/2009 | Tipler | |
| 2009/0052497 A1 | 2/2009 | Tipler | |
| 2009/0084261 A1 | 4/2009 | Tipler | |
| 2009/0165873 A1 | 7/2009 | Chordia | |
| 2009/0183634 A1 | 7/2009 | Zeeuw | |
| 2009/0223369 A1 * | 9/2009 | Uegaki | F27D 21/0028 |
| | | | 96/102 |
| 2009/0249959 A1 | 10/2009 | Jones | |
| 2009/0277245 A1 | 11/2009 | Tipler | |
| 2010/0101304 A1 * | 4/2010 | McIntyre | G01N 30/7206 |
| | | | 73/23.37 |
| 2010/0101411 A1 | 4/2010 | Tipler | |
| 2010/0242579 A1 | 9/2010 | Tipler | |
| 2011/0079143 A1 | 4/2011 | Marotta | |
| 2011/0146380 A1 * | 6/2011 | Schleifer | G01N 30/16 |
| | | | 73/23.37 |
| 2011/0192214 A1 * | 8/2011 | Calleri | G01N 30/20 |
| | | | 73/23.35 |
| 2012/0085149 A1 * | 4/2012 | Al-Eid | G01N 30/12 |
| | | | 73/23.41 |
| 2012/0118144 A1 * | 5/2012 | Cates | G01N 1/2273 |
| | | | 95/19 |
| 2012/0175954 A1 | 7/2012 | Hinatsu | |
| 2012/0296077 A1 * | 11/2012 | Roewer | A61K 9/0019 |
| | | | 536/46 |
| 2013/0112550 A1 | 5/2013 | Marsh | |
| 2013/0219992 A1 * | 8/2013 | Okada | G01N 30/28 |
| | | | 73/23.41 |
| 2013/0247650 A1 * | 9/2013 | Okada | G01N 30/02 |
| | | | 73/23.42 |

(56) References Cited

U.S. PATENT DOCUMENTS

| 2013/0276512 | A1 | 10/2013 | Bae | |
|---|---|---|---|---|
| 2014/0248708 | A1* | 9/2014 | Coleman | G01N 30/74 |
| | | | | 436/141 |
| 2014/0250978 | A1* | 9/2014 | McCauley | G01N 30/16 |
| | | | | 73/23.39 |

FOREIGN PATENT DOCUMENTS

| WO | 2000045929 | 8/2000 |
|---|---|---|
| WO | 2002044684 | 6/2002 |
| WO | 2006024851 | 3/2006 |

OTHER PUBLICATIONS

IPRP for PCT/US2009/045300 dated Nov. 30, 2010.
Batterman. J. Environ. Monit. (2002), vol. 4, pp. 870-878.
Harper. J. Chromat. A. (2000) vol. 885, pp. 129-151.
IPRP for PCT/US2010/028236 dated Sep. 27, 2011.
IPRP for PCT/US2010/50828 dated Nov. 19, 2010.
Extended Search Report for EP16818581 dated May 8, 20418.

* cited by examiner

| Time, min | Split Flow Rate, mL/min | | | | | | | |
|---|---|---|---|---|---|---|---|---|
| | 25 | 50 | 100 | 200 | 300 | 400 | 500 |
| 1 | 14.5 | 27.0 | 52.0 | 102.0 | 152.5 | 202.5 | 252.0 |
| 2 | 13.0 | 23.7 | 45.1 | 88.0 | 131.4 | 174.3 | 216.6 |
| 5 | 10.3 | 17.8 | 32.8 | 62.8 | 93.5 | 123.5 | 152.8 |
| 10 | 8.2 | 13.2 | 23.2 | 43.2 | 64.0 | 84.0 | 103.2 |
| 20 | 6.5 | 9.5 | 15.5 | 27.5 | 40.4 | 52.4 | 63.5 |
| 50 | 5.1 | 6.5 | 9.2 | 14.7 | 21.1 | 26.5 | 31.1 |
| 100 | 4.6 | 5.3 | 6.7 | 9.6 | 13.4 | 16.3 | 18.2 |

FIG. 18

| Supply mL/min | Split Flow Rate, mL/min ||||||||
|---|---|---|---|---|---|---|---|---|
| | 25 | 50 | 100 | 200 | 300 | 400 | 500 |
| 50 | 0 | 0 | 45 | 135 | 225 | 315 | 405 |
| 100 | 0 | 0 | 0 | 90 | 180 | 270 | 360 |
| 150 | 0 | 0 | 0 | 45 | 135 | 225 | 315 |
| 200 | 0 | 0 | 0 | 0 | 90 | 180 | 270 |
| 250 | 0 | 0 | 0 | 0 | 45 | 135 | 225 |

FIG. 19

| Supply mL/min | Split Flow Rate, mL/min | | | | | | | |
|---|---|---|---|---|---|---|---|---|
| | 25 | 50 | 100 | 200 | 300 | 400 | 500 |
| 50 | 1.7 | 3.3 | 6.7 | 13.3 | 20.0 | 26.7 | 33.3 |
| 100 | 0.8 | 1.7 | 3.3 | 6.7 | 10.0 | 13.3 | 16.7 |
| 150 | 0.6 | 1.1 | 2.2 | 4.4 | 6.7 | 8.9 | 11.1 |
| 200 | 0.4 | 0.8 | 1.7 | 3.3 | 5.0 | 6.7 | 8.3 |
| 250 | 0.2 | 0.3 | 0.7 | 1.3 | 2.0 | 2.7 | 3.3 |

FIG. 20

| H₂ (mL/min) | Oxygen (mL/min) | | | | |
|---|---|---|---|---|---|
| | 50 | 100 | 150 | 200 | 250 |
| 15 | 0.0117 | 0.0121 | | | |
| 20 | | 0.0150 | 0.0139 | 0.0136 | 0.0136 |
| 30 | 0.0113 | 0.0153 | 0.0190 | 0.0162 | 0.0192 |
| 40 | | 0.0151 | 0.0200 | 0.0211 | 0.0214 |
| 50 | | 0.0168 | 0.0207 | 0.0201 | 0.0221 |
| 60 | | | | 0.0201 | |

FIG. 23

CHROMATOGRAPHY SYSTEMS WITH MOBILE PHASE GENERATORS

PRIORITY APPLICATION

This application is related to, and claims priority to and the benefit of, U.S. Provisional Application No. 62/186,759 filed on Jun. 30, 2015, the entire disclosure of which is hereby incorporated herein by reference for all purposes.

TECHNOLOGICAL FIELD

This application is related to chromatographic systems and methods that use an internally generated mobile phase for chromatographic separations. In certain instances, the systems may comprise an internal hydrogen gas generator fluidically coupled to a chromatography column to provide hydrogen gas for separation of analyte species.

BACKGROUND

Chromatography systems use a mobile phase to provide analyte species to a column. The mobile phase is typically provided from an external liquid or gas source.

SUMMARY

In one aspect, a gas chromatography system configured to separate analyte species without using any externally introduced carrier gas is provided.

In certain embodiments, the system comprises an internal gas generator configured to fluidically couple to a chromatography column to provide carrier gas generated by the internal gas generator to the chromatography column. In other embodiments, the system is configured to use gas generated by the internal gas generator to control pressure in the system. In some examples, the system comprises a plurality of gas generators, in which each gas generator is independently controlled to regulate pressure in the system. In certain configurations, the system is configured to control the pressure without using a pneumatic pressure controller. In some examples, the internal gas generator comprises an electrolysis device. In other embodiments, the electrolysis device is fluidically coupled to a water reservoir. In further instances, the electrolysis device is configured to generate hydrogen and oxygen from electrolysis of water received from the water reservoir and to use the hydrogen as a carrier gas and use the oxygen as a detector gas. In additional examples, the electrolysis device comprises an anode, a cathode and a membrane between the anode and the cathode. In some embodiments, the system comprises a dryer fluidically coupled to the cathode and configured to receive hydrogen gas generated at the cathode and remove water from the received hydrogen gas. In some examples, the system comprises a detector fluidically coupled to the internal gas generator, the detector configured to receive gas from the internal gas generator and use the received gas to detect separated species received from a chromatography column in the system. In other configurations, the system comprises a gas reservoir fluidically coupled to the internal gas generator and configured to store at least one gas produced by the gas generator. In some instances, the detector comprises a flame or a filament wire. In other instances, the detector is configured to use the received gas as a make-up gas.

In another aspect, a gas chromatography system configured to separate vaporized species using a gas chromatography column and a carrier gas, the gas chromatography system comprising a housing comprising an internal gas generator configured to generate the carrier gas is described.

In some configurations, the system is configured to use the generated carrier gas to control pressure in the system. In other configurations, the system comprises a plurality of gas generators, in which each gas generator is independently controlled to regulate pressure in the system. In certain embodiments, the system is configured to control the pressure without using a pneumatic pressure controller. In certain examples, the system comprises an electrolysis device configured to generate hydrogen and oxygen from water. In some embodiments, the electrolysis device is fluidically coupled to a water reservoir. In further embodiments, the water reservoir is positioned external to the housing. In additional examples, the electrolysis device comprises an anode, a cathode and a membrane between the anode and the cathode. In some examples, the system comprises a gas reservoir fluidically coupled to the internal gas generator and configured to store at least one gas produced by the gas generator. In other examples, the generated oxygen is also provided to a detector fluidically coupled to the internal gas generator. In certain embodiments, the detector comprises a flame or a filament wire. In other embodiments, the detector is configured to use the received gas as a make-up gas. In some examples, the system comprises an inlet configured to couple to an external carrier gas source, in which the inlet is configured to fluidically couple to a chromatography column in the housing.

In an additional aspect, a gas chromatography system comprising a housing comprising an internal gas generator configured to generate hydrogen and use the generated hydrogen as a carrier gas for the introduction and separation of analyte species into the gas chromatography system is provided.

In certain embodiments, the system is further configured to use the generated hydrogen gas as a fuel for a detector of the gas chromatography system. In other embodiments, the system is further configured to use the generated hydrogen gas as a makeup gas for a detector of the gas chromatography system. In some embodiments, the system is configured to generate oxygen gas concurrently with generation of the hydrogen. In other embodiments, the internal gas generator comprises an electrolysis device. In some examples, the electrolysis device is fluidically coupled to a water reservoir. In additional examples, the electrolysis device is configured to generate hydrogen and oxygen gas from electrolysis of water received from the water reservoir. In some embodiments, the electrolysis device comprises an anode, a cathode and a membrane between the anode and the cathode. In other embodiments, the system comprises a gas reservoir fluidically coupled to the internal gas generator and configured to store at least one gas produced by the gas generator. In additional embodiments, the system comprises a detector fluidically coupled to the internal gas generator, the detector configured to receive gas from the internal gas generator and use the received gas to detect separated species received from a chromatography column in the system. In further instances, the detector comprises a flame or a filament wire. In some examples, the detector is configured to use the received gas as a make-up gas. In other examples, the system comprises a plurality of gas generators, in which each gas generator is independently controlled to regulate pressure in the system. In certain instances, the system is configured to control the pressure without using a pneumatic pressure controller.

In another aspect, a gas chromatography system configured to separate analyte species using a chromatography column is provided. In certain configurations, the gas chromatography system comprises an injector configured to fluidically couple to the chromatography column to provide sample comprising the analyte species from the injector to the chromatography column, an internal gas generator configured to fluidically couple to the injector and the chromatography column to provide carrier gas generated by the internal gas generator to the injector and to the chromatography column, and a detector configured to fluidically couple to the chromatography column to receive separated analyte species from the chromatography column.

In certain embodiments, the system comprises a second internal gas generator. In other embodiments, the detector is configured to provide a flame or comprises a wire filament. In some instances, the system comprises a gas reservoir fluidically coupled to the internal gas generator and configured to store at least one gas generated by the internal gas generator. In other embodiments, the system comprises a second gas reservoir fluidically coupled to the internal gas generator, in which the gas reservoir receives a first gas from the gas generator and the second gas reservoir receives a second gas from the gas generator. In certain embodiments, the detector is a thermal conductivity detector or a discharge ionization detector. In other embodiments, the system is configured to separate analyte species without using any external carrier gas. In some examples, the system is configured to control the pressure within the system without using a pneumatic pressure controller. In some embodiments, the system comprises an inlet configured to introduce a second carrier gas that is different from the carrier gas generated by the internal gas generator. In other configurations, the internal gas generator is configured to generate hydrogen and oxygen. In certain examples, the internal gas generator comprises an electrolysis cell configured to electrolyze water to generate the hydrogen and the oxygen. In some embodiments, the system comprises a first port configured to receive the generated hydrogen and provide the generated hydrogen to a chromatography column and comprising a second port configured to receive the generated oxygen and provide the generated oxygen to the detector.

In an additional aspect, a method comprising generating a carrier gas within a housing of a gas chromatography system. In certain embodiments, the method comprises providing the generated carrier gas to a chromatography column. In some examples, the method comprises providing the generated carrier gas to a detector. In certain examples, the method comprises generating hydrogen as the carrier gas. In some instances, the method comprises generating oxygen with the hydrogen by electrolyzing water. In certain examples, the method comprises separating analyte species introduced in the gas chromatography system without using any external carrier gas. In some embodiments, the method comprises introducing an external gas into the gas chromatography system, in which the external gas is different than the carrier gas generated within the housing of the gas chromatography system. In other embodiments, the method comprises using the generated carrier gas to control pneumatic pressure of the gas chromatography system. In additional embodiments, the method comprises controlling the pneumatic pressure without the use of a pneumatic pressure controller. In some instances, the method comprises controlling the rate of carrier gas generation to control the pneumatic pressure.

In another aspect, a method of analyzing a sample comprising analyte species using a gas chromatography system comprising generating a carrier gas within the gas chromatography system and providing vaporized analyte species in the generated carrier gas to a chromatography column is described. In certain embodiments, the method comprises generating the carrier gas using an internal gas generator, in which the internal gas generator is fluidically coupled to the chromatography column. In some embodiments, the method comprises providing the vaporized analyte species to the chromatography column without using any external carrier gas. In certain examples, the method comprises introducing a second carrier gas into the gas chromatography system. In additional examples, the method comprises providing the generated carrier gas to a detector. In certain embodiments, the method comprises providing hydrogen as the generated carrier gas and providing oxygen co-generated with the hydrogen to the detector. In other embodiments, the method comprises configuring the detector as a flame detector. In additional examples, the method comprises providing a portion of the hydrogen and oxygen to a gas reservoir. In other embodiments, the method comprises providing the hydrogen to a first gas reservoir and providing the oxygen to a second gas reservoir. In some instances, the method comprises introducing a second gas into the chromatography system and to a detector within the gas chromatography system, the second gas configured as a fuel for the detector.

In an additional aspect, a method of separating analyte species introduced into a gas chromatography column comprising providing vaporized analyte introduced into the gas chromatography system in a carrier gas generated internally within the gas chromatography system to the chromatography column is described. In some embodiments, the method comprises generating the carrier gas using an internal gas generator, in which the internal gas generator is fluidically coupled to the chromatography column. In certain examples, the method comprises providing the vaporized analyte species to the chromatography column without using any external carrier gas. In certain embodiments, the method comprises introducing a second carrier gas into the gas chromatography system. In some examples, the method comprises providing the generated carrier gas to a detector. In certain examples, the method comprises providing hydrogen as the generated carrier gas and providing oxygen co-generated with the hydrogen to the detector. In certain embodiments, the method comprises configuring the detector as a flame detector. In other examples, the method comprises providing a portion of the hydrogen and oxygen to a gas reservoir. In some examples, the method comprises providing the hydrogen to a first gas reservoir and providing the oxygen to a second gas reservoir. In certain examples, the method comprises configuring the hydrogel fuel cell as a hydrogen fuel cell stack. In some examples, the method comprises introducing a second gas into the chromatography system and to a detector within the gas chromatography system, the second gas configured as a fuel for the detector.

In another aspect, a method of controlling pneumatic pressure within a gas chromatography system comprising controlling a rate of carrier gas generation from an internal gas generator within the gas chromatography system is described.

In an additional aspect, a method of controlling pneumatic pressure within a gas chromatography system comprising controlling a flow of an internally generated carrier gas within the gas chromatography system is provided. In certain examples, the method comprises generating the carrier gas using water and an electrolysis cell. In some instances, the method comprises controlling the current provided to the electrolysis cell to control the rate of carrier gas generation. In other instances, the method comprises controlling an amount of water present in the electrolysis cell to control the rate of carrier gas generation. In certain embodiments, the method comprises controlling the current provided to the electrolysis cell and an amount of water in the electrolysis cell to control the rate of carrier gas generation.

In another aspect, a method of separating two or more analytes in a gas chromatography system comprising providing a gas generator configured to fluidically couple to a gas chromatography column and provide a generated carrier gas to the gas chromatography column is disclosed. In certain embodiments, the method comprises providing instructions for using the gas generator to generate a carrier gas internally within the gas chromatography system. In some examples, the method comprises providing instructions for coupling the gas generator to a detector of the gas chromatography system.

Other aspects, embodiments, examples and configurations are described in more detail herein.

BRIEF DESCRIPTION OF THE SEVERAL VIEWS OF THE DRAWINGS

Certain specific aspects, embodiments and configurations are described with reference to the accompanying figures in which:

FIG. 18 is a table showing mean flow rate calculations, in accordance with certain examples;

FIG. 19 is a table showing desired buffering capacities at various flow rates, in accordance with certain examples;

FIG. 20 is a table showing pressure recovery calculations, in accordance with certain examples;

FIG. 23 is a table showing FID sensitivity where oxygen is supplied to the FID, in accordance with certain examples.

It will be recognized by the person of ordinary skill in the art, given the benefit of this disclosure, that the selected components shown in the figures may form only a portion of those components which are present in a chromatography system. In addition, the exact positioning of one component relative to another component may vary.

DETAILED DESCRIPTION

Certain configurations of systems, devices and methods are described herein that use or provide a generated mobile phase, e.g., a gas, to separate two or more analytes in a sample. In some examples, the generated mobile phase may be produced from a gas generator. By producing a carrier gas and/or detector gas using a gas generator, several attributes may be achieved including, but not limited to, easier setup, fewer or no external connections, integrated gas generation control from the system, a smaller footprint and the ability to perform chromatographic separations and/or detection without the use of bulky external gas tanks. Illustrative components that can be used are those components commonly used with gas chromatography systems commercially available from PerkinElmer Health Sciences, Inc. (Waltham, Mass.).

In certain embodiments, the chromatography systems described herein may comprise an internal mobile phase generator that generates at least one mobile phase. For example, the system may comprise an internal gas generator that can provide at least one carrier gas to a chromatography column configured to separate two or more analyte species in a sample. In some instances, the carrier gas can also be used to assist in pressure control within the system, e.g., pneumatic pressure controllers can be omitted if desired. In other configurations, two or more gases can be internally generated with one or both of the gases being used as a carrier gas. If desired, one or both of the gases may also be provided to a detector for use in detection of analyte species. In some configurations, at least one of the internally generated gases may be hydrogen, e.g., hydrogen and oxygen can be generated from electrolysis of water.

Figure 1:
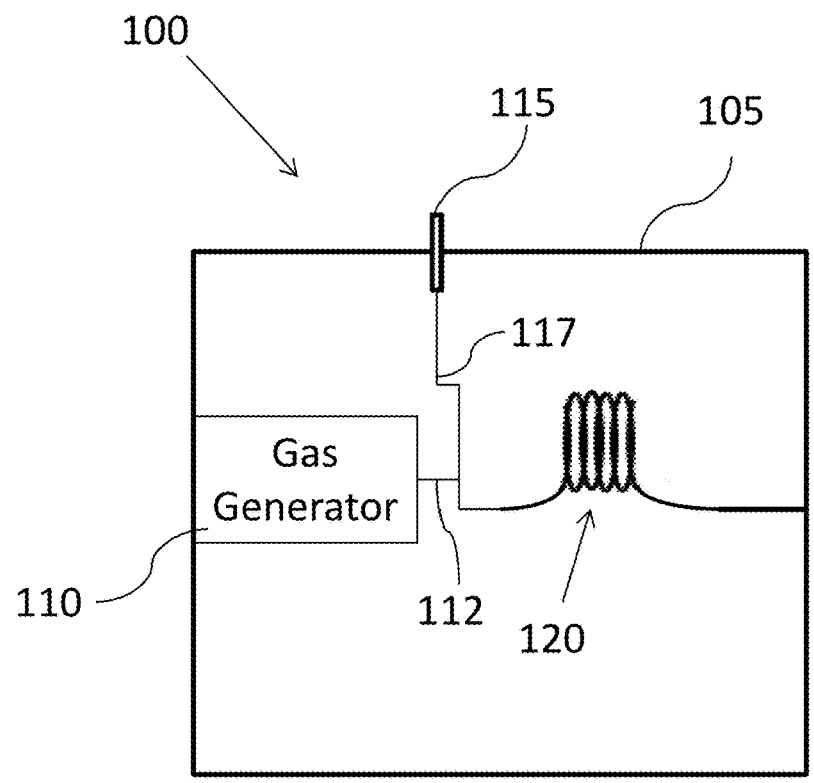
FIG. 1 is an illustration of a system comprising an internal gas generator, in accordance with certain configurations.

In certain examples and referring to FIG. 1, a system 100 is shown comprising a housing 105 that includes an internal gas generator 110 fluidically coupled to a column 120. The gas generator 110 is fluidically coupled to a column 120 through a fluid line 112. The column 120 is also fluidically coupled to an injector 115 through a fluid line 117. The fluid lines 117 and 112 can couple to each other through a tee or union or using other means. In certain instances, gas generated by the gas generator 110 may carry sample injected into the injector 115 to the column 120. While not shown, an oven or other heating device is typically present to maintain the sample in the gas phase while it is being carried in the gas generated by the generator 110. In some configurations, the column 120 can be positioned within the oven to maintain the column at a constant temperature. In other configurations, the gas generator 110 may be configured to receive one or more reactants, reactant vials or reactant reservoirs which can be used to generate the gas. For example, where the gas generated is hydrogen gas, then the reactants may be water or may comprise water. Where the gas generated is oxygen gas, then the reactants may be water or may comprise water. Where the gas generated is nitrogen gas, then the reactants may be ammonia, ammonia water or may comprise ammonia or ammonia water or other sources of nitrogen. In some instances, the system 100 may comprise two internal gas generators. For example, the system 100 may comprise a first internal generator that can provide for a first volume of gas. When carrier gas demand is high, then system 100 can switch on the second internal generator to increase the overall volume (and pressure) of carrier gas provided to the column 120. The internal gas generators may be the same or may be different, e.g., may generate the same gas or gases or may generate different gases.

Figure 2:
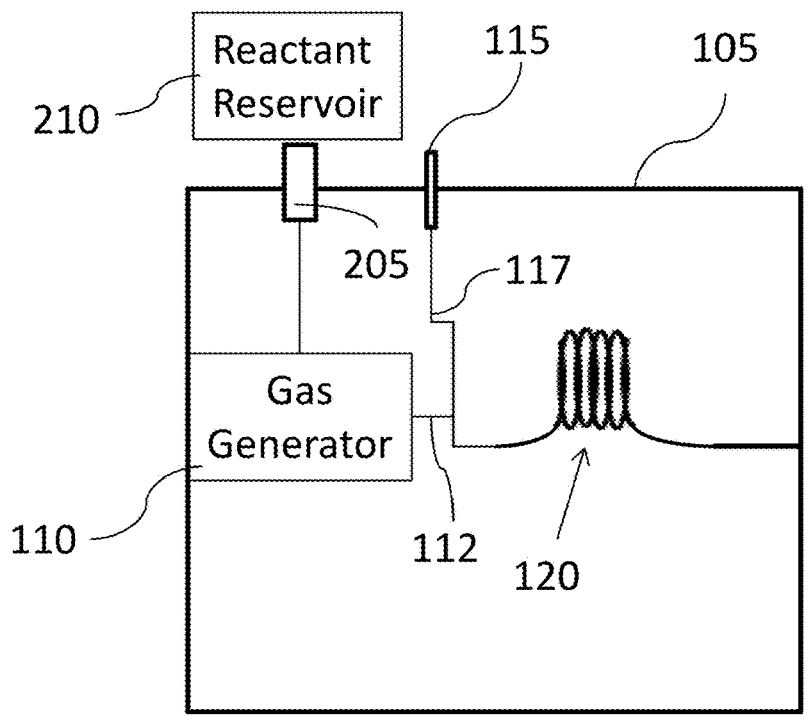
FIG. 2 is an illustration of a system comprising an internal gas generator and an external reactant reservoir, in accordance with certain configurations.

In some instances, the gas generator 110 may be fluidically coupled to a port that permits an end user to resupply reactant to the gas generator 110. Referring to FIG. 2, a port 205 can be configured to receive a reactant reservoir 210. The reactant reservoir may take many different forms including a reactant cartridge, a reactant vessel or a fluid line that is fluidically coupled to a reactant source, e.g., in the case of water, the gas generator may be fluidically coupled to a distilled water source. One or more pumps or other devices (not shown) can be present to control the rate of delivery of the reactant into the gas generator 110. One or more heating jackets or devices may also be present to control the temperature of the reactant delivered to the gas generator 110. If desired, two or more reactant reservoirs can be fluidically coupled to the gas generator 110. Where two or more reactant reservoirs are fluidically coupled to the gas generator 110, the reactant reservoirs may comprise the same or different reactants.

Figure 3:
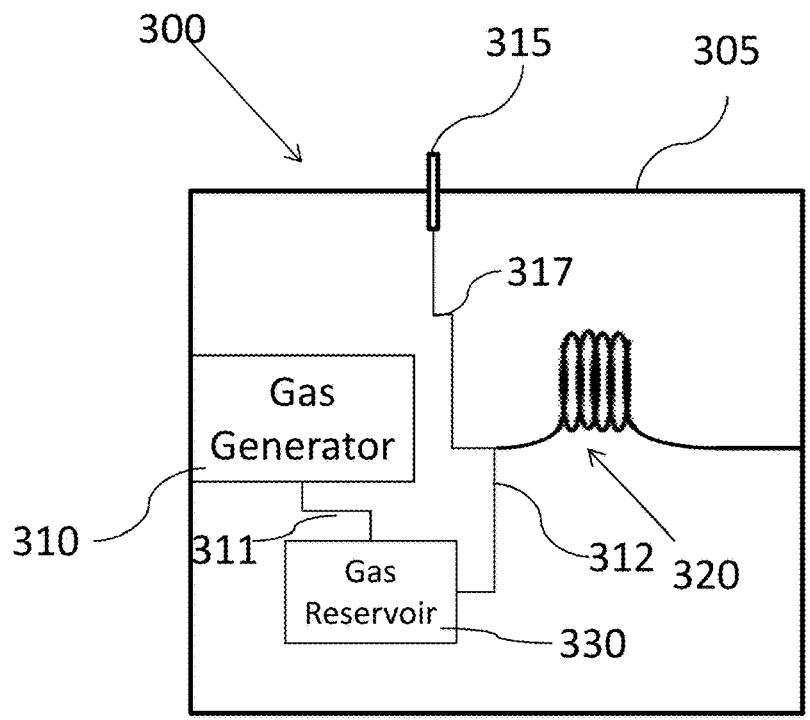
FIG. 3 is an illustration of a system comprising an internal gas generator and an internal gas reservoir, in accordance with certain configurations.
Figure 4:
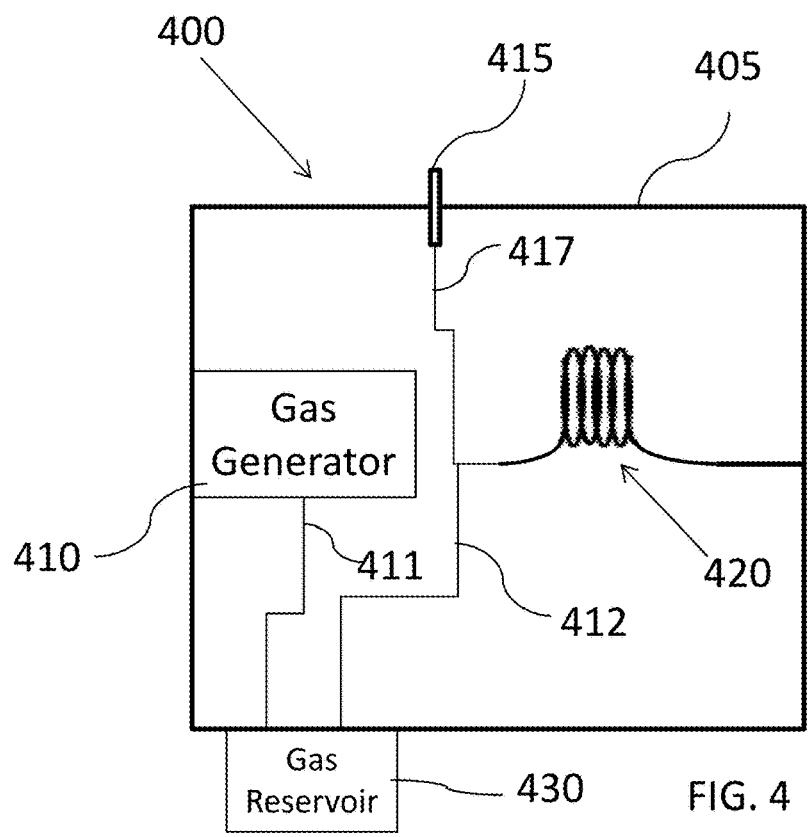
FIG. 4 is an illustration of a system comprising an internal gas generator and an external gas reservoir, in accordance with certain configurations.

In certain configurations, the gas generated by the gas generator may be provided directly to a chromatography column or can be stored in one or more gas buffer chambers or reservoirs. The gas buffer chambers or reservoirs can be within an instrument housing or may be external to and coupled to an instrument housing. Illustrative configurations are shown in FIGS. 3 and 4. Referring to FIG. 3, a system 300 comprises a housing 305 that includes a gas generator 310, an injector 315, a chromatography column 320 and a gas reservoir 330. The gas generator 310 is configured to generate one or more carrier gases that are stored in the gas reservoir 330. The gas reservoir 330 is fluidically coupled to the column 320 through a fluid line 312. The injector 315 is fluidically coupled to the column 320 through a fluid line 317. If desired, the reservoir 330 can be positioned with an oven (not shown) to maintain the carrier gas temperature at a desired temperature. It may be desirable to include the gas reservoir 330 such that the gas flow demands by the system can be met. For example, at low flow rates the gas generator 310 may be able to generate carrier gas on demand such that no gas reservoir 330 is needed. In some instances, gas flow rates may be high such that additional buffering capacity can be achieved by including a gas reservoir 330. In other configurations, it may be desirable to generate and store the gas in the reservoir 330 so that the gas generator 310 is not constantly operating. For example, in portable applications it may be desirable to first generate the gas and store it in the reservoir 330 prior to initiation of any chromatographic separations. By first generating a gas and then switching off the gas generator 310, reduced power consumption during chromatographic separations can be achieved. For example, as noted in more detail below, the systems may comprise a detector that is used to detect species eluting from the column 320. To power the detector and other electronics of the system, it may be desirable to reduce overall power consumption during detection by maintaining the generator 310 in an off state. If desired, however, the generator 310 can be switched on at any time or may run continuously during detection. While not shown, one or more valves can be present upstream and/or downstream of the gas reservoir 330 to prevent or permit flow of gas from the reservoir 330. In some instances, the reservoir 330 may be fluidically coupled to a pump (not shown) to provide a desired gas pressure within the system 330. As noted herein, by controlling the pressure in the reservoir 330 and/or the output of the generator 310, the pressure within the system 300 may be controlled optionally without any pneumatic pressure controllers, e.g., by regulating the gas flow from the reservoir 330 and/or gas production by the generator 310. While a single gas reservoir 330 is shown, it may be desirable to include two or more internal gas reservoirs. For example, where the gas generator produces hydrogen and oxygen from electrolysis of water, the hydrogen gas and the oxygen gas can be stored in separate gas reservoirs if desired. The volume of the two internal reservoirs may be the same or may be different. In some instances, the system 300 may comprise two internal gas generators. For example, the system 300 may comprise a first internal generator that can provide for a first volume of gas. When carrier gas demand is high, then system 300 can switch on the second internal generator to increase the overall volume (and pressure) of carrier gas provided to the column 320. Each of the internal generators may comprise one or more respective gas reservoirs if desired to increase the overall buffering capacity. The internal gas generators may be the same or may be different, e.g., may generate the same gas or gases or may generate different gases.

Referring now to FIG. 4, a system 400 is shown that comprises a gas reservoir 430 positioned external to a housing 405. The system 400 also comprises an injector 415 fluidically coupled to a column 420 through a fluid line 417. The external gas reservoir 430 is fluidically coupled to the column 420 through a fluid line 412 and to a gas generator 410 through a fluid line 411. It may be desirable to include the gas reservoir 430 external to the housing 405 such that the gas flow demands on the system can be met and/or the size of the buffering capacity provided by the reservoir 430 may be altered by altering the volume of the reservoir 430. For example, at low flow rates the gas generator 410 may be able to generate carrier gas on demand such that no gas reservoir 430 is needed. In some instances, gas flow rates may be high such that additional buffering capacity can be achieved by including a gas reservoir 430. In some instances where very high flow rates or pressures are needed, the volume of the reservoir can be altered by swapping the reservoir 430 with a different reservoir having a volume greater than the volume of the reservoir 430. Similarly, if only a small buffering capacity is desired, then a reservoir with a volume less than the volume of the reservoir 430 can be used. In any of these configurations, it may be desirable to generate and store the gas in the reservoir 430 so that the gas generator 410 is not constantly operating. For example, in portable applications it may be desirable to first generate the gas and store it in the reservoir 430 prior to initiation of any chromatographic separations. By first generating a gas and then switching off the gas generator 410, reduced power consumption during chromatographic separations can be achieved. For example, as noted in more detail below, the systems may comprise a detector that is used to detect species eluting from the column 420. To power the detector and other electronics of the system, it may be desirable to reduce overall power consumption during detection by maintaining the generator 410 in an off state. If desired, however, the generator 410 can be switched on at any time or may run continuously during detection. While not shown, one or more valves can be present upstream and/or downstream of the gas reservoir 430 to prevent or permit flow of gas from the reservoir 430. In some instances, the reservoir 430 may be fluidically coupled to a pump (not shown) to provide a desired gas pressure within the system 400. As noted herein, by controlling the pressure in the reservoir 430 (and/or the volume of the reservoir 430) and/or the output of the generator 410, the pressure within the system 400 may be controlled optionally without any pneumatic pressure controllers, e.g., by regulating the gas flow from the reservoir 430 and/or gas production by the generator 410. While a single gas reservoir 430 is shown, it may be desirable to include two or more external gas reservoirs. For example, where the gas generator produces hydrogen and oxygen from electrolysis of water, the hydrogen gas and the oxygen gas can be stored in separate external gas reservoirs if desired. Where two separate external gas reservoirs are present, the volume of the two reservoir may be the same or may be different. In some instances, the external reservoir 430 may fluidically couple to the generator 410 through one or more fitting or plugs that permit the reservoir 430 to be "plug and play" while providing a substantially fluid tight seal. In certain instances, the system 400 may comprise two internal gas generators. For example, the system 400 may comprise a first internal generator that can provide for a first volume of gas. When carrier gas demand is high, then system 400 can switch on the second internal generator to increase the overall volume (and pressure) of carrier gas provided to the column 420. Each of the internal generators may comprise one or more respective gas reservoirs (which can be external or internal) if desired to increase the overall buffering capacity. The internal gas generators may be the same or may be different, e.g., may generate the same gas or gases or may generate different gases.

Figure 5:
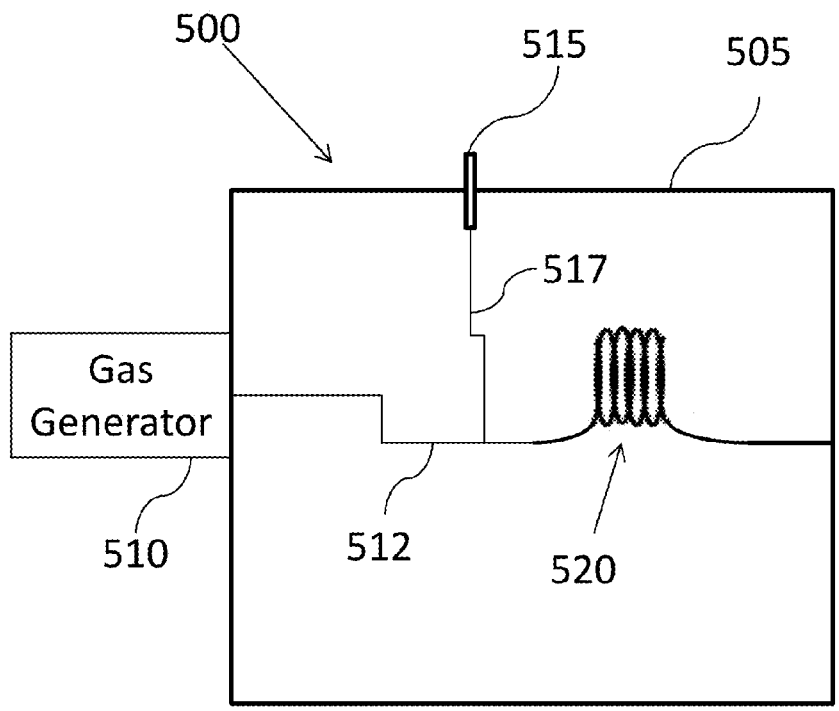
FIG. 5 is an illustration of a system comprising an external gas generator, in accordance with certain configurations.

In other configurations, the gas generator need not be contained within the instrument housing. Referring to FIG. 5, a system 500 is shown that comprises a housing 505 with an external gas generator 510 coupled to an external surface of the housing 505. To facilitate resupply of reactants to the generator 510, it may be desirable to position at least some portion of the gas generator 510 external to the housing 505. In some instances, reactant supply ports can be positioned external to the housing 505, whereas in other examples the entire gas generator 510 can be positioned external to the housing 505. The gas generator 510 is fluidically coupled to a column 520 through a fluid line 512. An injector 515 is fluidically coupled to the column 520 through a fluid line 517. The gas generator 510 can be fluidically coupled to the injector 515 through a tee, union or other fitting that joins the fluid lines 512, 517. In some configurations, the gas generator 510 may be removable or swappable such that the volume of gas generated by the generator 510 can be controlled. For example, as a simple illustration it may be desirable to design the generator 510 to provide a certain constant output $V_1$ at a fixed current or voltage. For chromatographic separations that require a volume higher than $V_1$, rather than altering the current or voltage to increase gas generation, it may be desirable to swap the generator 510 out with a generator of higher capacity or with a generator that comprises an internal gas reservoir that can provide for increased buffering capacity. In some instances, the system may comprise an internal gas generator and an external gas generator. For example, the system may comprise a first generator that can provide a first volume of gas. When carrier gas demand is high, then system can switch on the second generator (which can be external if the first generator is internal) to increase the overall volume (and pressure) of carrier gas provided to the column 520. In other configurations, the system may comprise two external gas generators which may be the same of may be different. If desired, the system 500 may comprise a plurality of individual external gas generators which can be individually controlled to alter the pressure of the system. The individual gas generators may be the same or may be different, e.g., may provide different gas outputs for a similar current input.

Figure 6:
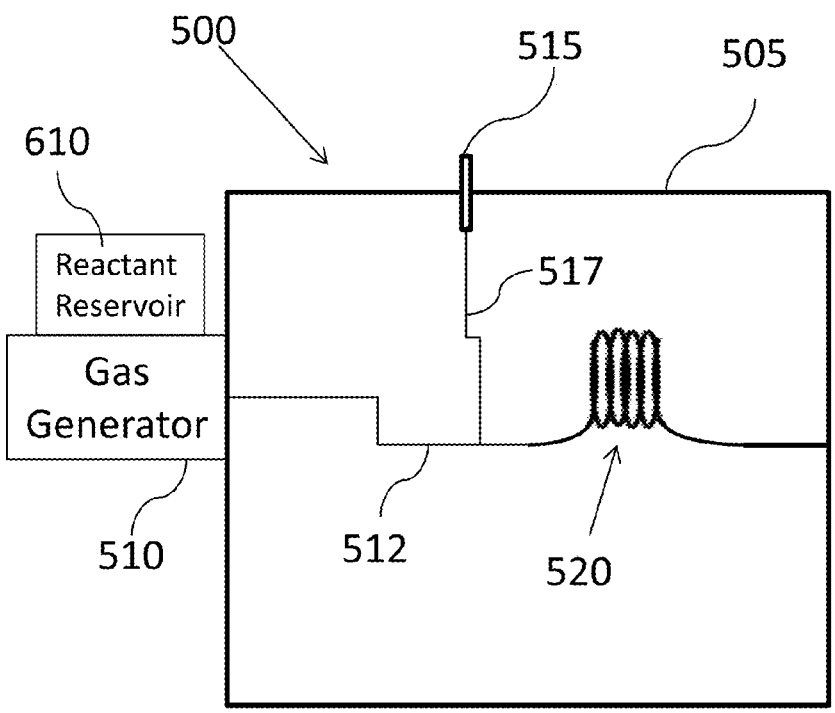
FIG. 6 is an illustration of a system comprising an external gas generator coupled to a reactant reservoir, in accordance with certain configurations.

In certain configurations, the external gas generator may fluidically couple to a reactant reservoir. Referring to FIG. 6, a gas generator 510 is fluidically coupled to a reactant reservoir 610. The reactant reservoir 610 may take many different forms including a reactant cartridge, a reactant vessel or a fluid line that is fluidically coupled to a reactant source, e.g., in the case of water, the gas generator may be fluidically coupled to a distilled water source. One or more pumps or other devices (not shown) can be present to control the rate of delivery of the reactant(s) into the gas generator 510. One or more heating jackets or devices may also be present to control the temperature of the reactant delivered to the gas generator 510. If desired, two or more reactant reservoirs can be fluidically coupled to the gas generator 510. Where two or more reactant reservoirs are fluidically coupled to the gas generator 510, the reactant reservoirs may comprise the same or different reactants. If desired, the reactant reservoir 610 may be located remote from the gas generator 510. For example, the reactant reservoir may be a remote fluid tank or remote reservoir of reactant that fluidically couples to the generator 510 through one or more fluid lines.

Figure 7:
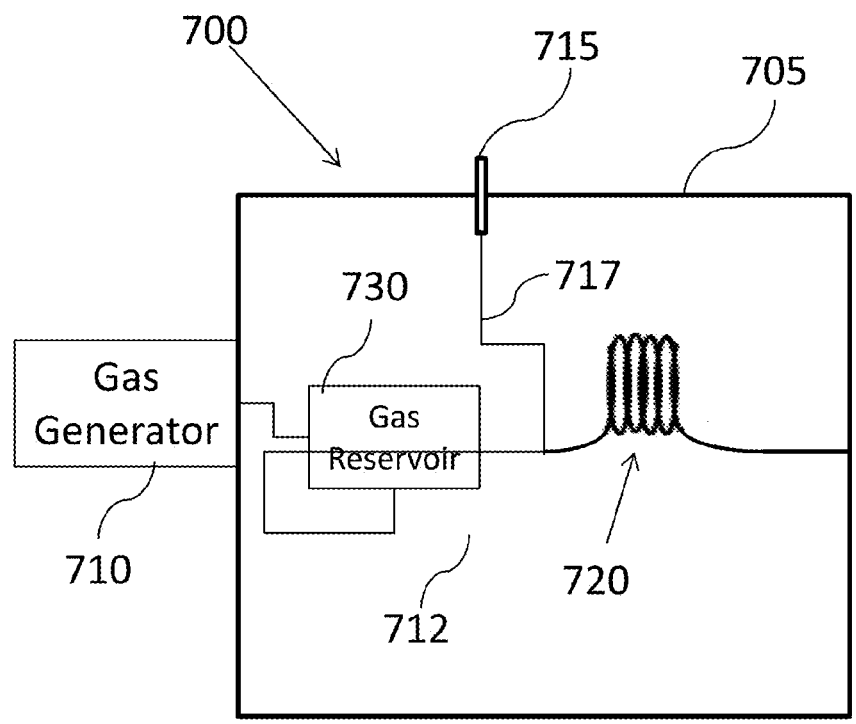
FIG. 7 is an illustration of a system comprising a gas generator coupled to a gas reservoir, in accordance with certain configurations.
Figure 8:
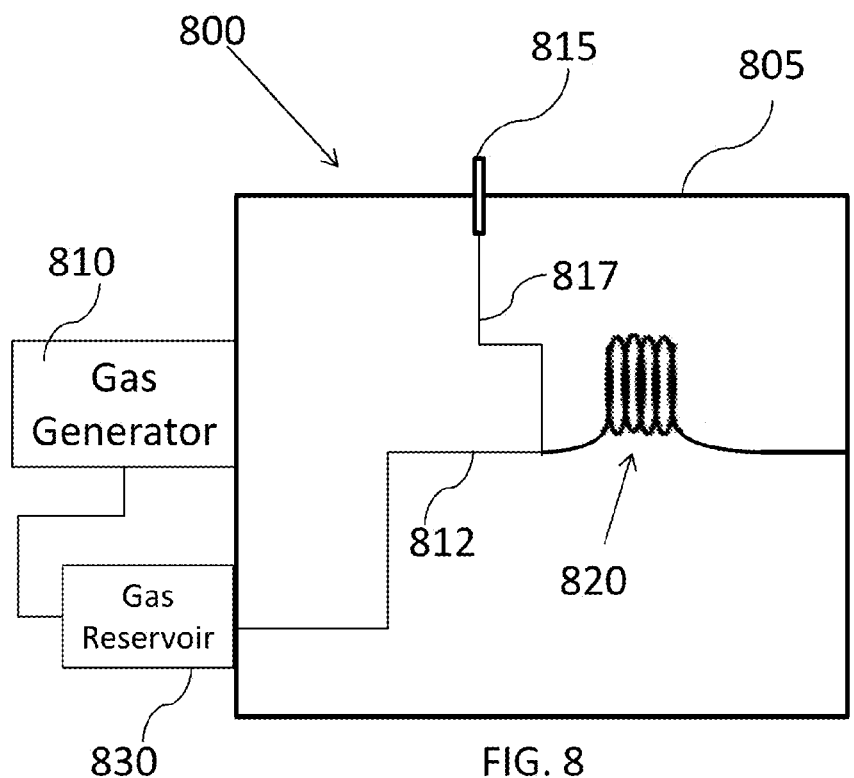
FIG. 8 is another illustration of a system comprising a gas generator coupled to a gas reservoir, in accordance with certain configurations.

In certain configurations, the gas generated by an external gas generator may be provided directly to a chromatography column or can be stored in one or more gas chambers or reservoirs. The gas chambers or reservoirs can be within an instrument housing or may be external to and coupled to an instrument housing. Illustrative configurations are shown in FIGS. 7 and 8. Referring to FIG. 7, a system 700 comprises a housing 705 that includes an external gas generator 710, an injector 715, a chromatography column 720 and an internal gas reservoir 730. The gas generator 710 is configured to generate one or more carrier gases that are stored in the internal gas reservoir 730. The gas reservoir 730 is fluidically coupled to the column 720 through a fluid line 712. The injector 715 is fluidically coupled to the column 720 through a fluid line 717. It may be desirable to include the gas reservoir 730 such that the gas flow demands on the system can be met. For example, at low flow rates the gas generator 710 may be able to generate carrier gas on demand such that no gas reservoir 730 is needed. In some instances, gas flow rates may be high such that additional buffering capacity can be achieved by including an internal gas reservoir 730. If desired, the reservoir 730 can be positioned within an oven (not shown) to maintain the carrier gas temperature at a desired temperature. In other configurations, it may be desirable to generate and store the gas in the reservoir 730 so that the gas generator 710 is not constantly operating. For example, in portable applications it may be desirable to first generate the gas and store it in the reservoir 730 prior to initiation of any chromatographic separations. By first generating a gas and then switching off the gas generator 710, reduced power consumption during chromatographic separations can be achieved. For example, as noted in more detail below, the systems may comprise a detector that is used to detect species eluting from the column 720. To power the detector and other electronics of the system, it may be desirable to reduce overall power consumption during detection by maintaining the generator 710 in an off state. If desired, however, the generator 710 can be switched on at any time, e.g., run intermittently, or may run continuously during detection. In some instances, the gas generator 710 can be removed from the system once sufficient gas is stored in the reservoir 730. While not shown, one or more valves can be present upstream and/or downstream of the gas reservoir 730 to prevent or permit flow of gas from the reservoir 730. In some instances, the reservoir 730 may be fluidically coupled to a pump (not shown) to provide a desired gas pressure within the system 730. As noted herein, by controlling the pressure in the reservoir 730 and/or the output of the generator 710, the pressure within the system 700 may be controlled optionally without any pneumatic pressure controllers, e.g., by regulating the gas flow from the reservoir 730 and/or gas production by the generator 710. While a single gas reservoir 730 is shown, it may be desirable to include two or more internal gas reservoirs. For example, where the gas generator produces hydrogen and oxygen from electrolysis of water, the hydrogen gas and the oxygen gas can be stored in separate gas reservoirs if desired. The volume of the two internal reservoirs may be the same or may be different. In some instances, the system 700 may comprise two external gas generators. For example, the system 700 may comprise a first external generator that can provide for a first volume of gas. When carrier gas demand is high, then system 700 can switch on the second external generator to increase the overall volume (and pressure) of carrier gas provided to the column 720. Each of the external generators may comprise one or more respective gas reservoirs if desired to increase the overall buffering capacity. The external gas generators may be the same or may be different, e.g., may generate the same gas or gases or may generate different gases. In other configurations, the system 700 may comprise one external gas generator and one internal gas generator, only one internal gas generator or more than two gas generators (any one of which may be internal or external).

Referring now to FIG. 8, a system 800 is shown that comprises a gas reservoir 830 positioned external to a housing 805. The system 800 also comprises an injector 815 fluidically coupled to a column 820 through a fluid line 817. The external gas reservoir 830 is fluidically coupled to the column 820 through a fluid line 812. It may be desirable to include the gas reservoir 830 and the gas generator 810 external to the housing 805 such that the gas flow demands on the system can be met and/or the size of the buffering capacity provided by the reservoir 830 may be altered by altering the volume of the reservoir 830 and/or the capacity of the generator 810. For example, at low flow rates the gas generator 810 may be able to generate carrier gas on demand such that no gas reservoir 830 is needed (or gas is not permitted to flow from the reservoir 830). In some instances, gas flow rates may be high such that additional buffering capacity can be achieved by including a gas reservoir 830. In some instances where very high flow rates or pressures are needed, the volume of the reservoir can be altered by swapping the reservoir 830 with a different reservoir having a volume greater than the volume of the reservoir 830. Similarly, if only a small buffering capacity is desired, then a reservoir with a volume less than the volume of the reservoir 830 can be used. Also, the capacity of the generator 810 may be limited, and swapping the generator 810 with a generator of higher capacity can further aid in controlling the pressure of the system 800. In any of these configurations, it may be desirable to generate and store the gas in the reservoir 830 so that the gas generator 810 is not constantly operating. For example, in portable applications it may be desirable to first generate the gas and store it in the reservoir 830 prior to initiation of any chromatographic separations. By first generating a gas and then switching off the gas generator 810, reduced power consumption during chromatographic separations can be achieved. For example, as noted in more detail below, the systems may comprise a detector that is used to detect species eluting from the column 820. To power the detector and other electronics of the system, it may be desirable to reduce overall power consumption during detection by maintaining the generator 810 in an off state. If desired, however, the generator 810 can be switched on at any time or may run continuously during detection. In addition, after the gas reservoir is charged with sufficient gas for one or more chromatographic separations, the gas generator 810 can be removed if desired. While not shown, one or more valves can be present upstream and/or downstream of the gas reservoir 830 to prevent or permit flow of gas from the reservoir 830. In some instances, the reservoir 830 may be fluidically coupled to a pump (not shown) to provide a desired gas pressure within the system 800. As noted herein, by controlling the pressure in the reservoir 830 (and the volume of the reservoir 830) and/or the output of the generator 810, the pressure within the system 800 may be controlled optionally without any pneumatic pressure controllers, e.g., by regulating the gas flow from the reservoir 830 and/or gas production by the generator 810. While a single gas reservoir 830 is shown, it may be desirable to include two or more external gas reservoirs or one external gas reservoir and one internal gas reservoir. For example, where the gas generator produces hydrogen and oxygen from electrolysis of water, the hydrogen gas and the oxygen gas can be stored in separate gas reservoirs (with one or both positioned external to the housing 805) if desired. Where two separate gas reservoirs are present, the volume of the two reservoirs may be the same or may be different. In some instances, the external reservoir 830 may fluidically couple to the generator 810 through one or more fittings or plugs that permit the reservoir 830 to be "plug and play" while providing a substantially fluid tight seal. In certain configurations, the system 800 may comprise two external gas generators. For example, the system 800 may comprise a first external generator that can provide for a first volume of gas. When carrier gas demand is high, then system 800 can switch on the second external generator to increase the overall volume (and pressure) of carrier gas provided to the column 820. Each of the external generators may comprise one or more respective gas reservoirs if desired to increase the overall buffering capacity. The gas generators may be the same or may be different, e.g., may generate the same gas or gases or may generate different gases. One of the generators may be internal and the other generator may be external or both generators may be internal or external. More than two generators may also be present if desired.

Figure 9:
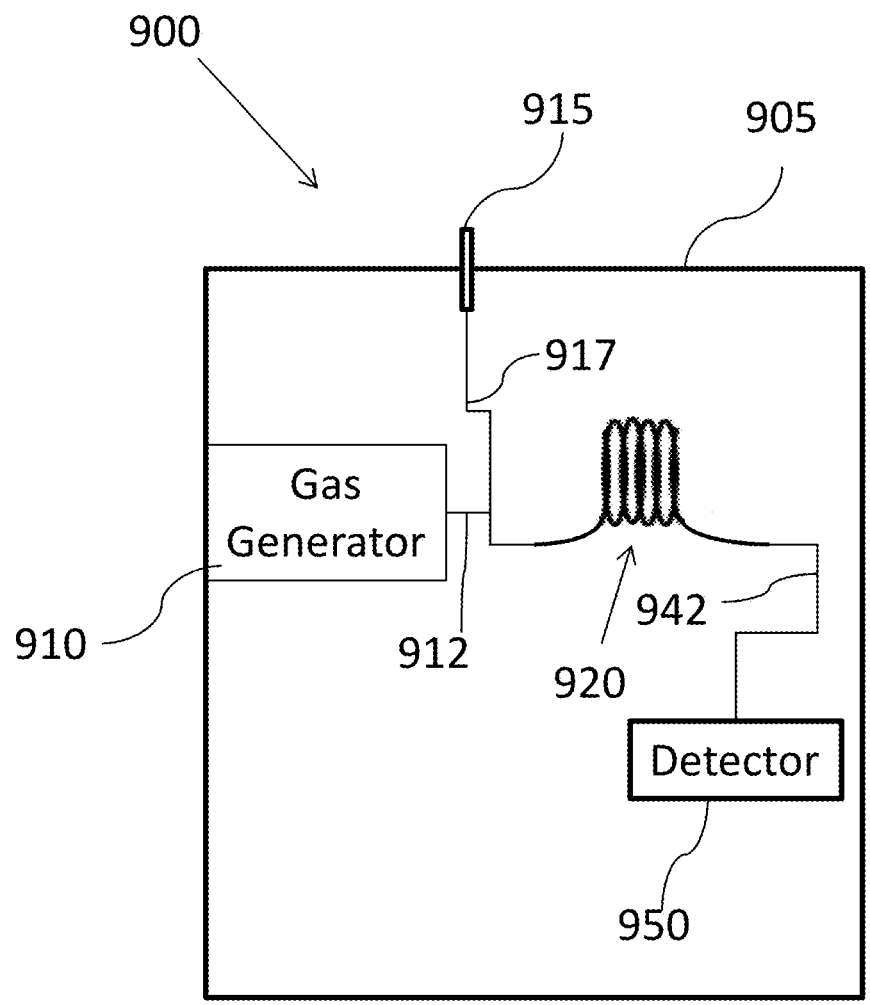
FIG. 9 is an illustration of a system comprising a gas generator and a detector, in accordance with certain configurations.

In certain embodiments, the gas generators and/or gas reservoirs may also be fluidically coupled to one or more other components present in the chromatography system. For example, the gas generated by the gas generator can be used to provide a gas to a detector that is part of the system. Referring to FIG. 9, a system 900 is shown that comprises a housing 905 comprising an internal gas generator 910 fluidically coupled to a column 920 through a fluid line 912. An injector 915 is fluidically coupled to the column 920 through a fluid line 917. The column 920 is fluidically coupled to the detector 950 through a fluid line 942. While the generator 910 is shown as being internal, it could instead be positioned external to the housing 905 if desired. In the configuration shown in FIG. 9, the gas generated by the generator 910 can be used as a fuel source for the detector 950. For example, where the generator 910 is configured to generate hydrogen and/or oxygen gas, one or both of these gases can be provided to the detector 950 through the various fluid lines 912 and 942. In particular, the hydrogen and oxygen can be used to fuel a flame or other ionization source, e.g., plasma, spark or arc, that can permit detection of the analytes that elute from the column 920. While a single fluid line 942 is shown in FIG. 9 as being fluidically coupled to the detector 950, one or more additional fluid lines (which may be internal or external) can also be present. For example, the detector 950 can be fluidically coupled to an external gas source or an external gas generator as desired. Illustrative detectors suitable for use in the system of FIG. 9 include, but are not limited to, a flame ionization detector (FID, a flame photometric detector (FPD), an electron capture detector (ECD), a nitrogen phosphorous detector (NPD), a thermal conductivity detector (TCD), a photoionization detector (PID), a mass spectrometer or other detectors that use electrodes or conductive materials to monitor passage of analyte or detectors which use high gas flow rates. If operation of a detector requires a gas not produced by a gas generator present in the system 900, the detector gas can be provided from an external gas source as needed. While the detector 950 is shown in the system 900 within the housing 905, if desired the detector 950 could be positioned external to the housing or some portion of the detector 950 may be positioned external to the housing. In addition, other components such as, for example, a processor or computer that can control operation of the system may also be present.

Figure 10:
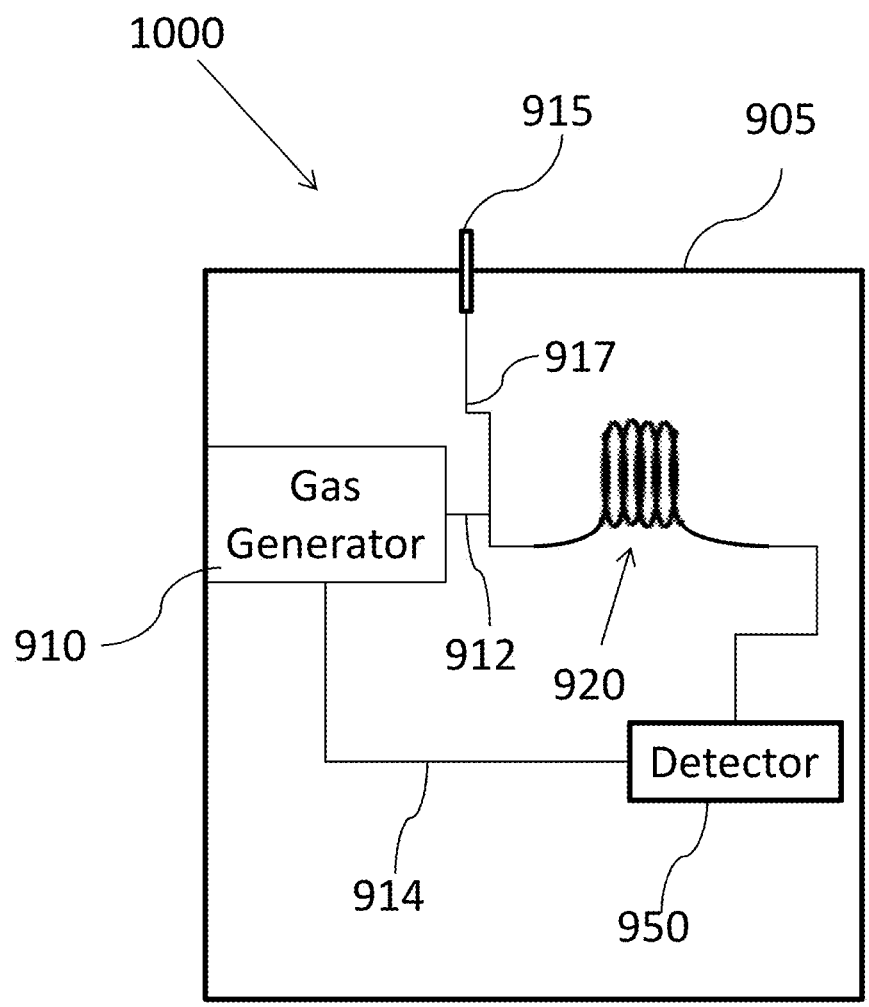
FIG. 10 is another illustration of a system comprising a gas generator and a detector, in accordance with certain configurations.

In certain configurations, the detector may be fluidically coupled to the gas generator through a separate fluid line. Referring to FIG. 10, an additional fluid line 914 is shown that fluidically couples the detector 950 to the gas generator 910 upstream of the column 920. The fluid line 914 fluidically couples the detector 950 directly to the generator 910. The fluid line 914 and the other fluid lines present in the system may include one or more valves to control the volume and/or pressure within a particular fluid line. For example, it may be desirable to have a larger flow of gas into the detector through the fluid line 914 than the gas flow into the column 920. A proportional valve, adjustment of the size of the fluid line 914, etc. can be used to provide for variable flow within the system 1000 shown in FIG. 10. In some instances, the generator 910 can instead be external to the housing 905. In other configurations, the detector 950 may comprise its own respective gas generator (not shown) that provides gas to the detector 950 for use as a fuel. The detector 950 shown in the system 1000 may be any of those described in reference to the detector 950 present in the system 900. While the detector 950 is shown in the system 1000 within the housing 905, if desired the detector 950 could be positioned external to the housing or some portion of the detector 950 may be positioned external to the housing.

Figure 11:
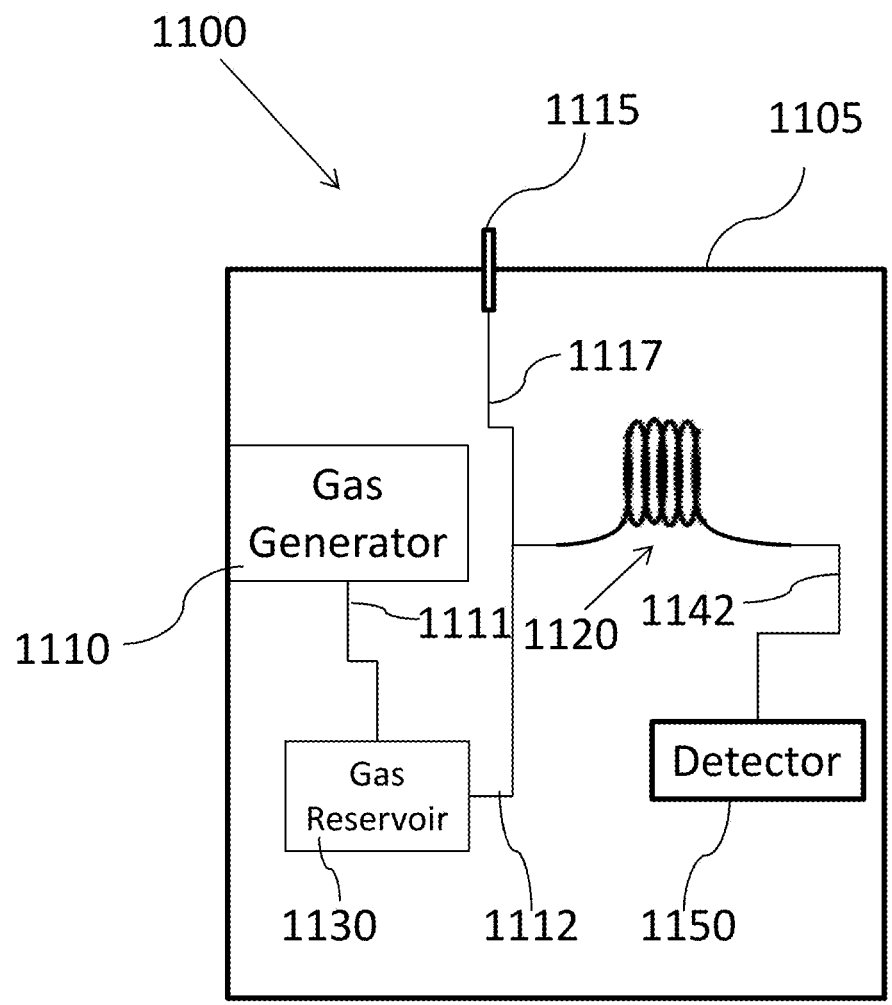
FIG. 11 is an illustration of a system comprising a gas generator, a gas reservoir and a detector, in accordance with certain configurations.

In certain embodiments where a detector is present in the system, it may be desirable to include one or more gas reservoirs in the system. Referring to FIG. 11, a system 1100 is shown comprising a housing 1105 which contains a gas generator 1110, a column 1120, a gas reservoir 1130 and a detector 1150. The gas generator 1110 is fluidically coupled to the gas reservoir 1130 through a fluid line 1111 to permit storage of generated gas by the reservoir 1130. One or more valves (not shown) can be present between the generator 1110 and the reservoir 1130 to permit flow (or deter flow) of gas into and out of the reservoir 1130. The reservoir 1130 is fluidically coupled to the column 1120 through a fluid line 1112. An injector 1115 is also fluidically coupled to the column 1120 through a fluid line 1117. The detector 1150 is fluidically coupled to the column 1120 through a fluid line 1142. If desired a separate fluid line may be present to directly fluidically couple the generator 1110 to the column 1120, and the reservoir 1130 may be present when additional gas capacity is needed for chromatographic separation and/or detection. While the generator 1110 is shown as being internal, it could instead be positioned external to the housing 1105 if desired. In the configuration shown in FIG. 11, the gas generated by the generator 1110 and stored in the reservoir 1130 can be used as a gas source by the detector 1150. For example, where the generator 1110 is configured to generate hydrogen and/or oxygen gas, these gases can be stored in the reservoir 1130 (or may be stored in two separate gas reservoirs) and provided to the detector 1150 through the various fluid lines 1112 and 1142. In particular, the hydrogen and oxygen can be used to fuel a flame or other ionization source, e.g., plasma, spark or arc, that can permit detection of the analytes that elute from the column 1120. While a single fluid line 1142 is shown in FIG. 11 as being fluidically coupled to the detector 1150, one or more additional fluid lines (which may be internal or external) can also be present. For example, the detector 1150 can be fluidically coupled to an external gas source or an external gas generator as desired. Illustrative detectors suitable for use in the system of FIG. 11 include, but are not limited to, a flame ionization detector (FID, a flame photometric detector (FPD), an electron capture detector (ECD), a nitrogen phosphorous detector (NPD), a thermal conductivity detector (TCD), a photoionization detector (PID), a mass spectrometer or other detectors that use electrodes or conductive materials to monitor passage of analyte or detectors which use high gas flow rates. If operation of a detector requires a gas not produced by a gas generator present in the system 1100, the detector gas can be provided from an external gas source as needed.

Figure 12:
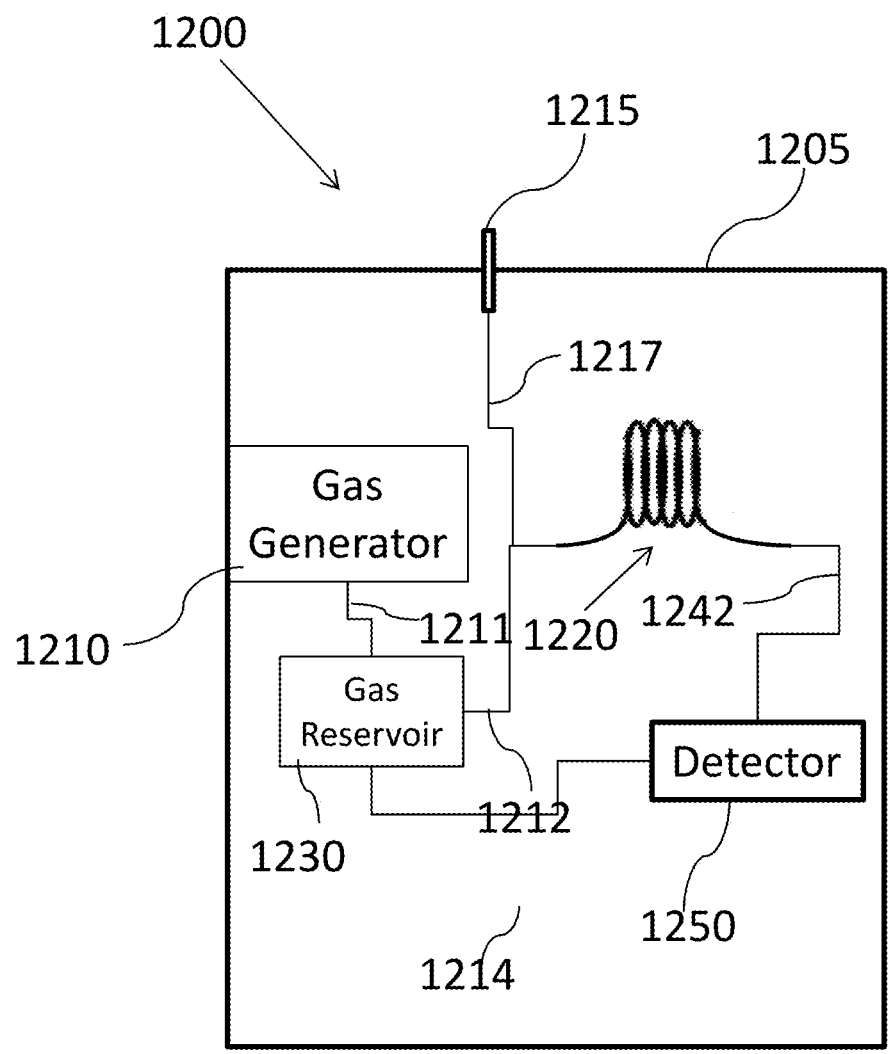
FIG. 12 is another illustration of a system comprising a gas generator, a gas reservoir and a detector, in accordance with certain configurations.

In certain instances, it may be desirable to directly couple a gas reservoir to the detector. Referring to FIG. 12, a system 1200 is shown that comprises a housing 1205 that includes a gas generator 1210, a column 1220, a gas reservoir 1230 and a detector 1250. The gas generator 1210 is fluidically coupled to the gas reservoir 1230 through a fluid line 1211 to permit storage of generated gas by the reservoir 1230. One or more valves (not shown) can be present between the generator 1210 and the reservoir 1230 to permit flow (or deter flow) of gas into and out of the reservoir 1230. The reservoir 1230 is fluidically coupled to the column 1220 through a fluid line 1212. The reservoir 1230 is also fluidically coupled directly to the detector 1250 through a fluid line 1214. An injector 1215 is also fluidically coupled to the column 1220 through a fluid line 1217. The detector 1250 is fluidically coupled to the column 1220 through a fluid line 1242. If desired a separate fluid line may also be present to directly fluidically couple the generator 1210 to the column 1220, and the reservoir 1230 may be present when additional gas capacity is needed for chromatographic separation and/or detection. While the generator 1210 is shown as being internal, it could instead be positioned external to the housing 1205 if desired. In the configuration shown in FIG. 12, the gas generated by the generator 1210 and stored in the reservoir 1230 can be used as a gas source by the detector 1250. For example, where the generator 1210 is configured to generate hydrogen and/or oxygen gas, these gases can be stored in the reservoir 1230 (or may be stored in two separate gas reservoirs) and provided to the directly to the detector 1250 through the fluid line 1214. In particular, the hydrogen and oxygen can be used to fuel a flame or other ionization source, e.g., plasma, spark or arc, that can permit detection of the analytes that elute from the column 1220. While a single fluid line 1242 is shown in FIG. 12 as being fluidically coupled to the detector 1250, one or more additional fluid lines (which may be internal or external) can also be present. For example, the detector 1250 can be fluidically coupled to an external gas source or an external gas generator as desired.

Figure 13:
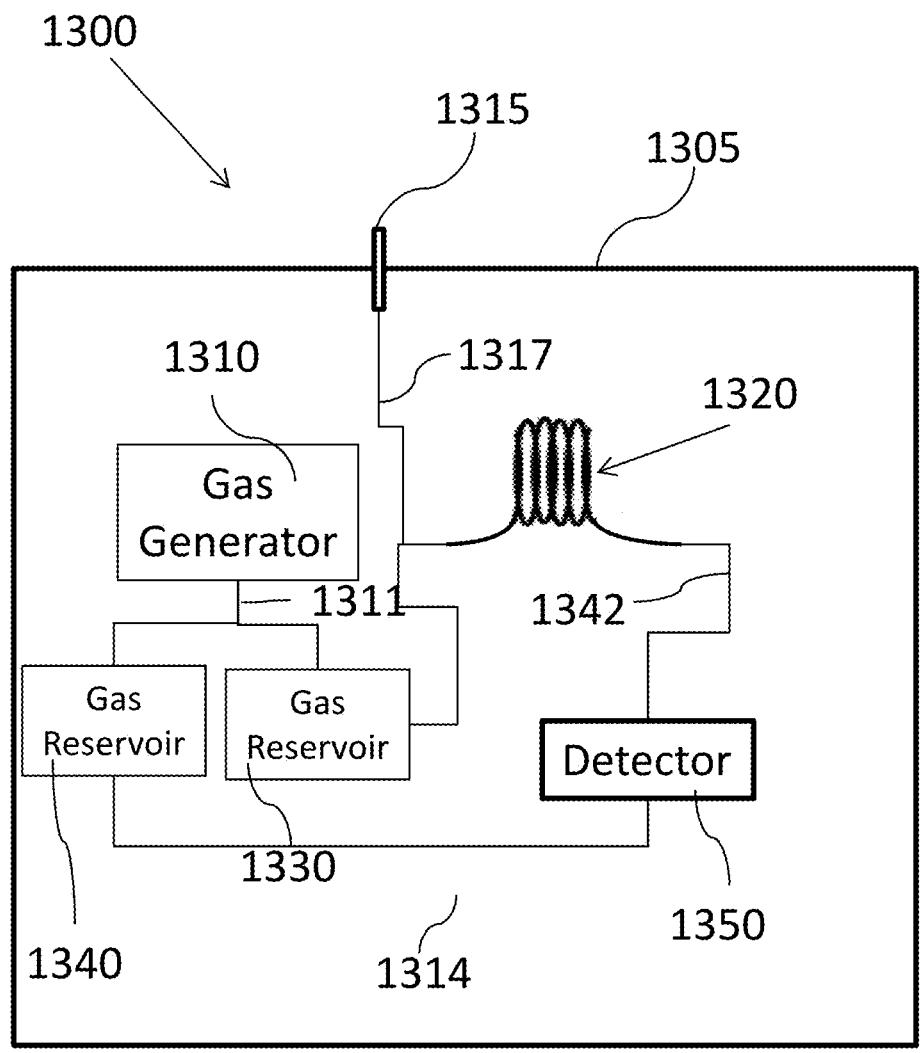
FIG. 13 is an illustration of a system comprising a gas generator, two gas reservoirs and a detector, in accordance with certain configurations.

In some embodiments, it may be desirable to include a first gas reservoir for chromatographic separations and a second gas reservoir used to provide a gas to a detector. Referring to FIG. 13, a system 1300 comprises a gas generator 1310, a column 1320, a first gas reservoir 1330, a second gas reservoir 1340 and a detector 1350. The gas generator 1310 is fluidically coupled to each of the gas reservoirs 1330, 1340 through a fluid line 1311 to permit storage of generated gas by the reservoirs 1330, 1340. One or more valves (not shown) can be present between the generator 1310 and the reservoirs 1330, 1340 to permit flow (or deter flow) of gas into and out of the reservoirs 1330, 1340. The reservoir 1330 is fluidically coupled to the column 1320 through a fluid line 1312. The reservoir 1340 is fluidically coupled directly to the detector 1350 through a fluid line 1314. An injector 1315 is also fluidically coupled to the column 1320 through a fluid line 1317. The detector 1350 is fluidically coupled to the column 1320 through a fluid line 1342. If desired a separate fluid line may also be present to directly fluidically couple the generator 1310 to the column 1320, and the reservoir 1330 may be used when additional gas capacity is needed for chromatographic separation. Similarly, the reservoir 1340 may be used when additional gas is needed for detection. While the generator 1310 is shown as being internal, it could instead be positioned external to the housing 1305 if desired. In the configuration shown in FIG. 13, the gas generated by the generator 1310 and stored in the reservoirs 1330, 1340 can be used as carrier gas for chromatographic separations and as a gas source by the detector 1350. For example, where the generator 1310 is configured to generate hydrogen and/or oxygen gas, these gases can be stored in the reservoirs 1330, 1340 (or in more than two separate gas reservoirs) and provided to the directly to the detector 1340 through the fluid line 1314. In particular, the hydrogen and oxygen can be used to fuel a flame or other ionization source, e.g., plasma, spark or arc, that can permit detection of the analytes that elute from the column 1320. While a single fluid line 1342 is shown in FIG. 13 as being fluidically coupled to the detector 1350, one or more additional fluid lines (which may be internal or external) can also be present. For example, the detector 1350 can be fluidically coupled to an external gas source or an external gas generator as desired. The reservoirs 1330, 1340 need not be sized to have the same volume. For example, it may be desirable to size one of the reservoirs 1330, 1340 to be larger than the other reservoir. In instances where high gas flow rates are used by the detector, the reservoir 1340 can be sized larger than the reservoir 1330 to provide higher buffering capacity. In some configurations, a fluid line may connect the reservoir 1330, 1340 to permit transfer of stored gas from one reservoir to the other.

Figure 14:
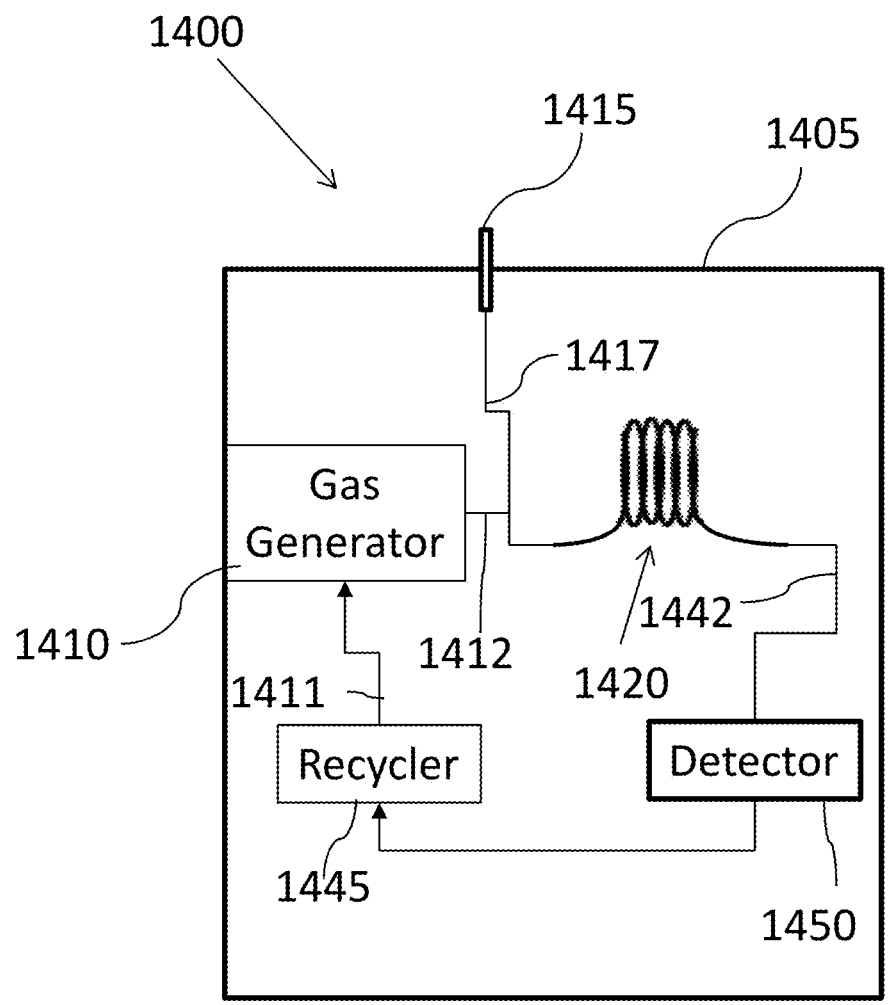
FIG. 14 is an illustration of a system comprising a gas generator, a recycler and a detector, in accordance with certain configurations.

In certain configurations, it may be desirable to recycle the gas (or other materials) that exits from the detector for reuse. For example, where the system generates hydrogen and oxygen from electrolysis of water, water vapor may be produced during the detection step. The water can be recaptured by condensation and returned to the gas generator for use in generating more hydrogen and oxygen. Referring to FIG. 14, a system 1400 is shown comprising a gas generator 1410, a column 1420, a detector 1450 and a recycler 1445 within a housing 1405. The gas generator 1410 is fluidically coupled to the column 1420 through a fluid line 1412 and to the recycler through a fluid line 1411. An injector 1415 is fluidically coupled to the column 1420 through a fluid line 1417. The column 1420 is fluidically coupled to the detector 1450 through a fluid line 1442. The recycler 1445 is fluidically coupled to each of the detector 1450 and the gas generator 1410. For example, the recycler 1445 may take the form of a condenser that receives water vapor that exits the detector. The water vapor can be condensed to liquid water, which may be provided as a reactant to the gas generator 1410 for generation of hydrogen and oxygen by electrolysis of the water. If desired, one or more traps or filters may be present between the detector 1450 and the recycler 1445 to remove any analytes within the fluid stream that exit the detector 1450. For example, activated charcoal, molecular sieves, glass beads or other adsorbents can be present in a filter between the detector 1450 and the recycler 1445 to remove any species from the exiting fluid stream other than water vapor. In some instances, the stream exiting the detector may be provided to a recycler positioned outside of the instrument. The external recycler can remove any impurities in the detector output stream and provide a reactant back to the gas generator 1410 for reuse.

Figure 15:
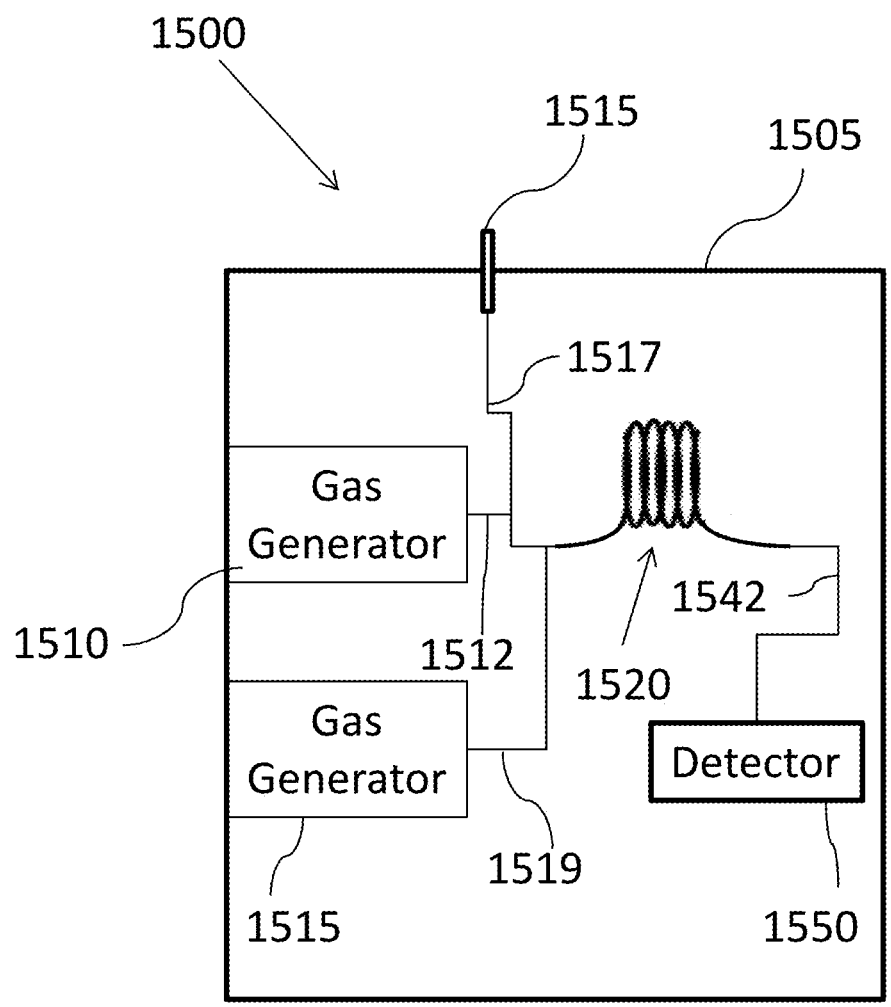
FIG. 15 is an illustration of a system comprising two gas generators and a detector, in accordance with certain configurations.
Figure 16:
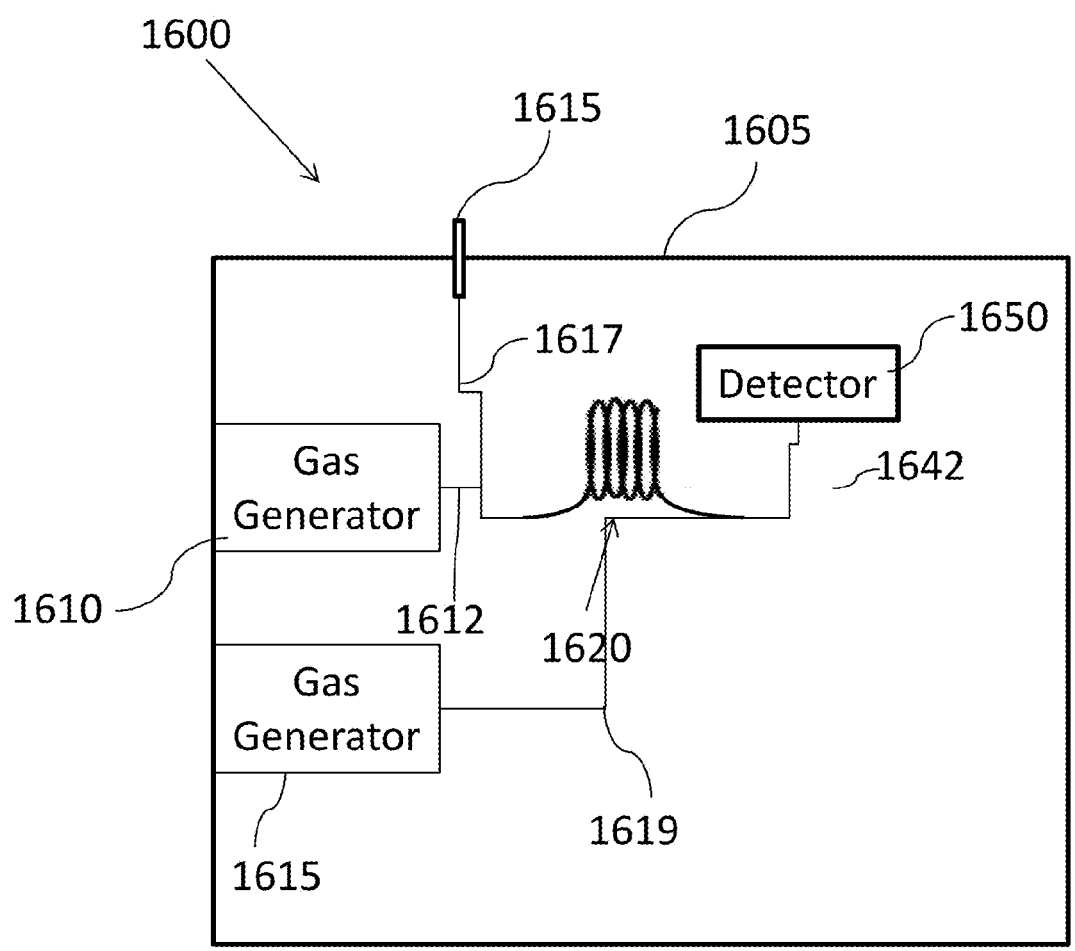
FIG. 16 is another illustration of a system comprising two gas generators and a detector, in accordance with certain configurations.

In some instances, it may be desirable to include two or more gas generators within a system to provide for enhanced pressure control. For example, a first gas generator can be activated and used for chromatographic separations and/or detection. Where it is desirable to control the pressure further, e.g., to increase the pressure in the system, a second external gas generator can be activated to provide for additional gas. In some instances (as discussed in more detail below), the two gas generators may be configured to provide for flow in substantially the same direction, e.g., toward a column and into a detector. In other instances, one of the gas generators can be configured to provide a back pressure that may be used to backflush the system or otherwise can be used to direct flow of sample in the system. Certain illustrations are shown in FIGS. 15 and 16. Referring to FIG. 15, a system 1500 is shown comprising a first gas generator 1510, a second gas generator 1515, a column 1520 and a detector 1550 within a housing 1505. The first generator 1510 is fluidically coupled to the column 1520 through a fluid line 1512. The second generator 1515 is fluidically coupled to the column 1520 through a fluid line 1519. An injector 1515 is fluidically coupled to the column 1520 through a fluid line 1517. The detector 1550 is fluidically coupled to the column 1520 through a fluid line 1542. In use of the system 1500, the first generator 1510 may generate and provide a carrier gas to the column 1520. If an increase or change in pressure is desired, the generator 1515 may be switched on (for at least some period) to alter the pressure within the system. The gas generated by each of the generators 1510, 1515 may be constant or may vary depending on the desired conditions. For example, the current or voltage provided to one or both of the generators 1510, 1515 can be altered to control the gas output from the generators 1510, 1515. In the configuration of FIG. 15, switching on of the generator 1515 provides for additional forward pressure toward the column 1520. This additional forward pressure may, for example, increase the flow rate of one or more analytes into the column, may be used to flush the column or may be used for other purposes. In one instance, the gas generator 1515 may be switched on once the analytes of interest are detected by the detector 1550 to flush any unwanted species from the column 1520 and to a vent (not shown) or other component of the system 1500. In some instances, the generator 1515 may be switched on after one analyte has eluted from the column 1520 but while other analytes of interest remain on the column 1520. This differential flow may provide for increased separation between early elution components that are hard to separate while reducing the overall run time to separate and detect all analytes of interest.

In another configuration and referring to FIG. 16, a system 1600 is shown comprising a first gas generator 1610, a second gas generator 1615, a column 1620 and a detector 1650 within a housing 1605. The first generator 1610 is fluidically coupled to the column 1620 through a fluid line 1612. The second generator 1615 is fluidically coupled to the column 1620 through a fluid line 1619. The fluid line 1619 couples at a site downstream from the column 1620, whereas the fluid line 1612 couples at a site upstream of the column 1620. An injector 1615 is fluidically coupled to the column 1620 through a fluid line 1617. The detector 1650 is fluidically coupled to the column 1620 through a fluid line 1642. In use of the system 1600, the first generator 1610 may generate and provide a carrier gas to the column 1620. If it is desirable to alter the pressure in the system 1600, the generator 1615 may be switched on for at least some period. Depending on the exact pressures provided by each of the generators 1610, 1615, the overall flow in the system may be forward, e.g., toward the detector 1650, or may be backward, e.g., toward the injector 1615. For example, it may be desirable to backflush the system 1600 for some period by switching on the generator 1615 and providing sufficient gas pressure so a counterflow of gas causes flow through the column 1620 to go back toward the injector 1615. A vent (not shown) can be coupled to the injector 1615 (or may be part of the injector 1615 in the case of a split-flow injector) to permit sample to exit the system 1600. In some instances where backflushing of the system 1600 is desired, the generator 1610 may be switched off and the generator 1615 may be switched on to reverse the flow of gas within the system 1600. In other instances, the generator 1610 may remain on, but the current or voltage provided to the generator 1610 may be reduced to reduce output from the generator 1610. The ability of one generated gas flow to oppose the flow of another generated gas flow permits enhanced pressure control within the system, backflushing operations and for further control of chromatographic separations and/or detection.

Figure 17:
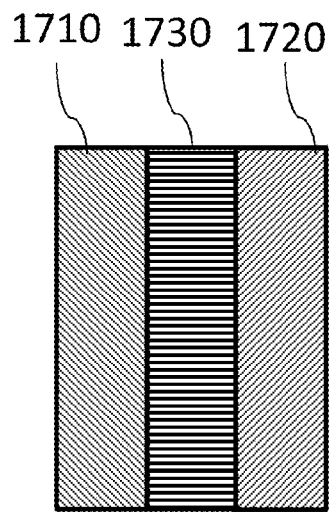
FIG. 17 is an illustration of certain components of a gas generator, in accordance with certain configurations.

In certain embodiments, the gas generators of the systems described herein can be configured in many different manners, for example, depending on the reactant(s) used, the desired gas to be generated, the power requirements and the overall footprint of the system. In some instances, the gas generator may be configured to electrolyze water to provide hydrogen gas and to provide oxygen gas. A simple illustration of a gas generator is shown in FIG. 17. The system comprises an anode 1710, a cathode 1720 and a membrane 1730 between the anode 1710 and the cathode 1720. If desired, each of the anode 1710 and the cathode 1730 can be configured as a layer that is coupled to the membrane 1730. In operation, a current is provided to the anode 1710 and the cathode 1720. If the electrodes 1710, 1720 are in contact with water in a water reservoir, then hydrogen gas can be produced at the cathode 1720 and oxygen gas can be produced at the anode 1710. One or both produced gases can be used for chromatographic separation and/or detection. As discussed in more detail below, it may be desirable to filter, purify or otherwise perform one or more physical or chemical operations on the produced gases prior to using the produced gases for chromatographic separation and/or detection. The anode 1710 and the cathode 1720 typically comprise one or more conductive materials and may comprise one or more catalysts on a surface. In other instances, a catalyst or conductive material can be disposed between the anode 1710 and the membrane 1730, between the cathode 1720 and the membrane 1730 or both. In some configurations, the membrane may comprise one or more materials that can transfer electrons and/or protons, e.g., may comprise Nafion® materials or other materials. In embodiments described herein that can use hydrogen and/or oxygen gas that is generated, it is a substantial attribute that both the hydrogen and the oxygen gas can be used. For example, the hydrogen gas can be used as a carrier gas and the oxygen gas can be used by the detector for combustion. The exact conditions used to electrolyze the water can vary. If desired, high pressure and/or high temperature can be used. For example, at high pressures (e.g., 1700-3000 psi) and/or high temperatures (e.g., 1000° C.), hydrogen and oxygen can be produced by electrolyzing water.

In configurations where the system comprises a detector, oxygen generated by the electrolysis reaction can be provided to the detector for use in a combustion reaction. For example, the oxygen may be provided to a flame based detector and can be used in the detection process. As noted herein, illustrative flame based detectors include, but are not limited to, a flame ionization detector (FID, a flame photometric detector (FPD), an electron capture detector (ECD), a nitrogen phosphorous detector (NPD), a thermal conductivity detector (TCD), a photoionization detector (PID), a mass spectrometer or other detectors that use electrodes or conductive materials to monitor passage of analyte or detectors which use high gas flow rates. Where certain types of detectors require a gas not produced by an internal generator, e.g., ECD may use nitrogen or a methane/argon feed, the detector gas can be provided from an external gas source as needed.

In certain embodiments, the gas generator may function similar to a hydrogen gas generator (e.g., a 20H, 40H or 60H Domnick Hunter model) commercially available from Parker Hannifin Manufacturing Limited (Cleveland, Ohio). Such a hydrogen gas generator includes a proton exchange membrane that produces hydrogen and oxygen from distilled water. Five 9s purity can be achieved using this technology to provide a substantially pure hydrogen gas flow that can be used as a carrier gas for chromatographic separations. This type of generator uses an electrochemical cell that comprises an anode, a cathode and the proton exchange membrane between the anode and the cathode. As water is consumed, it may be replaced to sustain the production of hydrogen and oxygen. As hydrogen is produced, it may be permitted to flow out of the cell or can be permitted to accumulate in the cell to increase the pressure. In some instances, it may be desirable to remove the generated hydrogen from the cell and to store it in a gas buffer reservoir (as noted herein) such that accumulation of hydrogen in the cell does not inhibit further hydrogen production.

In a typical configuration of an electrochemical cell, distilled water would flow from a water tank into the cell for electrolysis. Positively charged hydrogen ions are transported through the polymer electrolyte membrane. The positively charged hydrogen ions recombine to form molecular hydrogen and water. This feed can be provided to a dryer, desiccant, condenser or manifold assembly to separate the water from the hydrogen gas. In some instances, the hydrogen/water feed may be provided to a drying membrane to remove the water and permit passage of hydrogen gas. Negatively charged oxygen ions recombined to form molecular oxygen. The oxygen-saturated water can be provided to a water/oxygen separator vent to isolate the produced hydrogen from the oxygen. The oxygen-saturated water may be returned to the cell for further reaction or can be passed through a dryer, desiccant, condenser or manifold assembly to remove the water and leave behind substantially pure oxygen gas. As noted herein, the oxygen may be provided to a detector for use in sustaining a flame or other detection source. The oxygen can be less pure (if desired) than the hydrogen as the contaminant species may get burned in the detector. In some configurations, the line that comprises the oxygen can be coupled to the detector, and the line that comprises the hydrogen can be coupled to a column and/or injector for use in chromatographic separations. The electrical power provided to the cell is generally proportional to the amount of hydrogen generated as noted by Faraday's Laws of electrolysis. The power can be adjusted (up or down) to assist in controlling how much gases are generated and to assist in controlling the overall pressure in the system. If desired, a pressure sensor or pressure transducer may be present to measure the pressure of the system.

In certain configurations, the level of gas generated by the gas generator may depend, at least in part, on the current provided to the generator. For example, the amount of gas produced by the generator can be used to control the overall pressure in the system. Where a higher pressure is desired, an increased current or voltage can be provided to the generator to increase the output level of gas. Where a lower pressure is desired, a decreased current or voltage can be provided to the generator to decrease the output level of gas. In some configurations, the gas generator is under closed loop control to regulate the level of gas generated and/or to control the pressure in the system. By regulating the pressure through the gas generator, it is possible, for example, to omit expensive pneumatic controllers. Omission of the pneumatic controllers reduces overall cost and simplifies the construction of the system.

In some configurations, water vapor can be condensed from the air and used to generate the hydrogen and oxygen. For example, air can be drawn into a condenser (positioned inside the system or positioned external to the system), and water vapor in the air can be condensed to liquid water. In this configuration, the gas generator does not have to be fluidically coupled to a liquid water source or include a liquid water reservoir. In some instances, the non-condensed components in the air, e.g., nitrogen, may also be used as a carrier gas. For example, air can be drawn into a condenser using a pump, and the water vapor can be condensed into liquid water. The liquid water can be provided to a gas generator to generate hydrogen and oxygen, each of which can be used in chromatographic separations and/or detection. The remaining components in the air (which largely consists of nitrogen) can also be used, e.g., as a carrier gas, as a detector gas or to assist in controlling pressure within the system.

In certain configurations, the gas generator may thermolyze water to produce hydrogen and oxygen. Such thermolysis may take place at high temperature (e.g., 2000-2200° C.) to decompose water into hydrogen gas and oxygen gas. To increase thermolysis of the water, temperature can be raised to 3000° C. or above if desired. One or more catalysts may be present to increase hydrogen production during thermolysis.

In other configurations, hydrogen can be produced using a bioreactor comprising one or more organisms that may process an energy source and generate hydrogen during processing. For example, certain photoorganisms can produce hydrogen from sunlight. In particular, certain microorganisms, e.g., cyanobacteria, *Chlamydomonas, Chlamydomonas reinhardtii*, can be subjected to growth conditions which favor hydrogen production. In some cases, when these organisms are grown in conditions where one or more nutrients is missing, e.g., sulfur-free media, then the organisms may split water into hydrogen ions and electrons. Various ferredoxins and hydrogenases can combine the products to produce hydrogen gas at high efficiency. Where biorganisms are present in the gas generator, one or more light sources may be present to provide the light energy needed for the hydrogen production. In some configurations, the light energy may be provided by a light source present in the detector of the system, e.g., the light beam may be split such that certain wavelengths are provided to the bioreactor. If desired, the organisms can be grown in aerobic or anaerobic conditions depending on the particular organism.

In some embodiments, a gas can be generated by reforming a hydrocarbon reactant. For example, miniaturized steam reformer cells can be used to produce hydrogen using steam and hydrocarbons such as methane, methanol, ethane, propane, butane or other hydrocarbon based materials. One or more catalysts, e.g., catalysts comprising gold, iron, iron oxide and combinations thereof, can be used to reduce contaminant production and/or to increase the rate of hydrogen production.

In certain embodiments, the gas generator can be configured to use ammonia as a reactant and to decompose the ammonia catalytically to produce hydrogen and nitrogen. For example, the ammonia can be subjected to a catalyst, e.g., catalysts comprising one or more of ruthenium, iridium, nickel and combinations thereof, and heat to produce hydrogen and nitrogen. One attribute of decomposing ammonia is that side products which may result from producing hydrogen from stream reformation of hydrocarbons are not produced. The hydrogen can be produced by flowing the gaseous ammonia over a heated catalyst bed, e.g., a catalyst bed heated with a metal filament wire or within an oven to 400-500° C. or more. In some instances, the nitrogen produced may be provided to a detector for use in detection, whereas in other instances the nitrogen may be vented from the system or could be used in assisting with pressure control within the system.

While the systems described herein can include a gas generator, one or more external gas sources can also be present and used for chromatographic separations, for detection or both. For example, a helium source can be present and used for chromatographic separations. To reduce the overall consumption of the helium gas, the helium gas can be mixed with generated gas to provide a mixture of gases used as a carrier gas. This configuration can permit the use of lower amount of expensive helium gas while still providing desired separation times and or peak-to-peak separations of analytes.

In certain configurations, the exact amount of gas to be generated can vary from system to system and may depend, at least in part, on the chromatographic separation to be performed. In some examples, the system may use about 50 mL/minute of gas to perform the chromatographic separation. Where a split port injector is used, the system may use more than 50 mL/minute of gas. In some instances, it may be desirable to use splitless injectors to reduce the overall gas requirements of the system. In some embodiments as noted herein, where large flows of gas are needed, the system can include a gas reservoir to provide for additional capacity to meet the demands of the system. For example, where a split injector is used for a chromatography run of about 20 minutes total, the total volume of gas that flows through the split port may be about 600 mL. The volume of gas flowing through the column may be considerably less, e.g., about 80-85 mL total. To account for the total volume of about 685 mL for the single run, a gas reservoir can be sized and arranged appropriately, e.g., may comprise a volume equal to or greater than the volume needed for a chromatographic analysis. In some instances, the gas generator can be sized to maintain a substantially constant volume within the gas reservoir. In other configurations, the gas reservoir may be closed (to at least some degree) between injections to permit the level of gas in the reservoir to be restored prior to the next injection. For example, one or more pressure regulators can be present in the system to assist in flow control of the generated gas. While the exact gas output of the generators can vary, in some instances, the generator may be configured to provide at least 20 mL/min. of gas, at least 30 mL/min. of gas, at least 40 mL/min. of gas, at least 50 mL/min. of gas, at least 60 mL/min. of gas, at least 70 mL/min. of gas, at least 80 mL/min. of gas, at least 90 mL/min. of gas or at least 100 mL/min. of gas. As noted herein, where the gas demand exceeds the output capabilities of the generator, a gas reservoir or second gas generator can be used to provide for additional buffering capacity to meet the demands of the system.

In certain embodiments, to calculate a desired buffering capacity, the volume of gas used during the splitting can be multiplied by the ambient pressure. This result may be divided by the supply pressure to provide a particular buffering volume. By altering the pressures and various flows, the system can tune the gas flow to be consistent with the buffering volume. For example, where a supply pressure of 50 psig is used along with a buffering pressure of 100 psig, for a 200 mL/min. split flow rate and a supply flow rate of 100 mL/min. then a 90 mL buffer may be present to provide stable gas flows. For the same supply and buffering pressure, where a split flow rate of 100 mL/min. and a supply flow rate of 5 mL/min., a buffer of about 45 mL may be used. For the same supply and buffering pressure, where a split flow rate of 500 mL/min. and a supply flow rate of 250 mL/min. may be used, a buffer of about 225 mL may be used. By sizing the gas reservoir buffer to match that of the desired flow rates, stable and consistent flow can be achieved in the system.

In some embodiments, the gas generated by the gas generator can be stored in a gas reservoir and used to provide power to power the system. For example, hydrogen fuel cells can use the hydrogen as a fuel source to generate power. The generation and storage of the gas provides a pneumatic capacitor that can be used to provide power if desired. Such power may be desired for portable applications or for configurations where backup power is needed or desired.

In certain embodiments, the systems described herein may advantageously be used in environments where no external gas source is available or where such external gas sources are costly. For example, in many third world countries, little or no helium is available for chromatographic use. The ability of the systems described herein to use hydrogen as a carrier gas and to generate the hydrogen permits operation of the system in environments not previously achieved. In addition, the systems may be used in downhole applications, e.g., oil exploration and/or analysis applications, since there is no need to run a gas line from an external gas source to the instrument in the wellbore. The systems may also be used in aerospace applications to generate, for example, hydrogen carrier gas and oxygen detector gas without the need to supply external gases. These configurations permit chromatographic analysis at extraterrestrial sites including the Earth's atmosphere, in space, on spacecraft including satellites and ships and on foreign planets.

In certain instances, the systems and devices described herein can be used to generate a carrier gas, e.g., hydrogen, oxygen, nitrogen, etc. within a housing of a gas chromatography system. In certain embodiments, the generated carrier gas (or all generated gases) can be provided to a chromatography column. In some examples, one or both of the generated gases can be provided to a detector. As noted herein, oxygen can be generated with hydrogen by electrolyzing water. The oxygen can be used as a fuel by the detector if desired. In certain examples, analyte species introduced in the gas chromatography system can be separated without using any external carrier gas. In some embodiments, an external gas can be introduced into the gas chromatography system, in which the external gas can be different than (or the same as) the carrier gas generated within the housing of the gas chromatography system. In other embodiments, the generated carrier gas can be used to control pneumatic pressure of the gas chromatography system. In additional embodiments, the pneumatic pressure can be controlled without the use of a pneumatic pressure controller. In some instances, the rate of carrier gas generation can be used to control the pneumatic pressure.

In other embodiments, a carrier gas can be generated within the gas chromatography system and provided along with vaporized analyte species in the generated carrier gas to a chromatography column. In some instances, the carrier gas can be generated using an internal gas generator, in which the internal gas generator is fluidically coupled to the chromatography column. In other instances, the vaporized analyte species can be provided to the chromatography column without using any external carrier gas. In some embodiments, a second carrier gas can be introduced into the gas chromatography system. In other embodiments, the generated carrier gas can be provided to a detector or another gas co-generated with the carrier gas can be provided to a detector. For example, hydrogen can be provided as the generated carrier gas and oxygen co-generated with the hydrogen can be provided to the detector. In certain examples, the detector can be configured as a flame detector as described herein. In some examples, a portion of the gases generated can be provided to a gas reservoir. In some instances, the gases which are generated are provided to separate gas reservoirs. In certain examples, a second gas can be introduced into the chromatography system and to a detector within the gas chromatography system. If desired, the second gas can be configured as a fuel for the detector.

In some examples, vaporized analyte can be introduced into the gas chromatography system and mixed with a carrier gas generated internally within the gas chromatography system. The mixture of carrier gas and vaporized analyte can be provided to the chromatography column. In certain examples, the carrier gas is generated using an internal gas generator that is fluidically coupled to the chromatography column. In other examples, the vaporized analyte species can be provided to the chromatography column without using any external carrier gas. In some embodiments, a second carrier gas can be introduced into the gas chromatography system. In certain embodiments, the generated carrier gas can be provided to a detector. In some examples, hydrogen is provided as the generated carrier gas and oxygen co-generated with the hydrogen is provided to the detector. In certain embodiments, the detector may be a flame detector. In certain examples, a portion of the hydrogen and oxygen can be provided to a gas reservoir or to separate gas reservoirs. In other examples, a second gas can be introduced into the chromatography system and/or can be introduced into a detector within the gas chromatography system.

In some examples, controlling a rate of carrier gas generation from an internal gas generator within the gas chromatography system can be performed to control the pressure in the system. In other examples, controlling a flow of an internally generated carrier gas within the gas chromatography system can be performed to control the pressure in the system. In certain examples, the carrier gas is generated using water and an electrolysis cell. In some examples, the current provided to the electrolysis cell can be controlled to control the rate of carrier gas generation. In other examples, an amount of water present in the electrolysis cell can be controlled to control the rate of carrier gas generation. In some embodiments, the current provided to the electrolysis cell can be controlled and an amount of water in the electrolysis cell can be controlled to control the rate of carrier gas generation.

In certain embodiments, a gas generator can be configured to fluidically couple to a gas chromatography column and provide a generated carrier gas to the gas chromatography column. In certain instances, instructions for using the gas generator to generate a carrier gas internally within the gas chromatography system may be followed. In other instances, instructions for coupling the gas generator to a detector of the gas chromatography system may be followed.

Certain specific examples are described to illustrate some aspects and configurations of the technology further.

Example 1

Mean flow calculation rates were performed to determine a desired flow rate through a split flow system. The relationship of time and flow rate is shown in the chart of FIG. 18.

Example 2

Various gas buffer reservoir capacity calculations were performed to determine a desired gas buffer reservoir volume with various supply flow rates and split flow rates. The calculations are shown in the chart of FIG. 19.

Example 3

Pressure recovery calculations were performed to determine the time required to recover a desired pressure based on a supply pressure (50 psig) and a buffering pressure (100 psig). The results of the pressure recovery calculations are shown in the chart of FIG. 20.

Example 4

Figure 21:
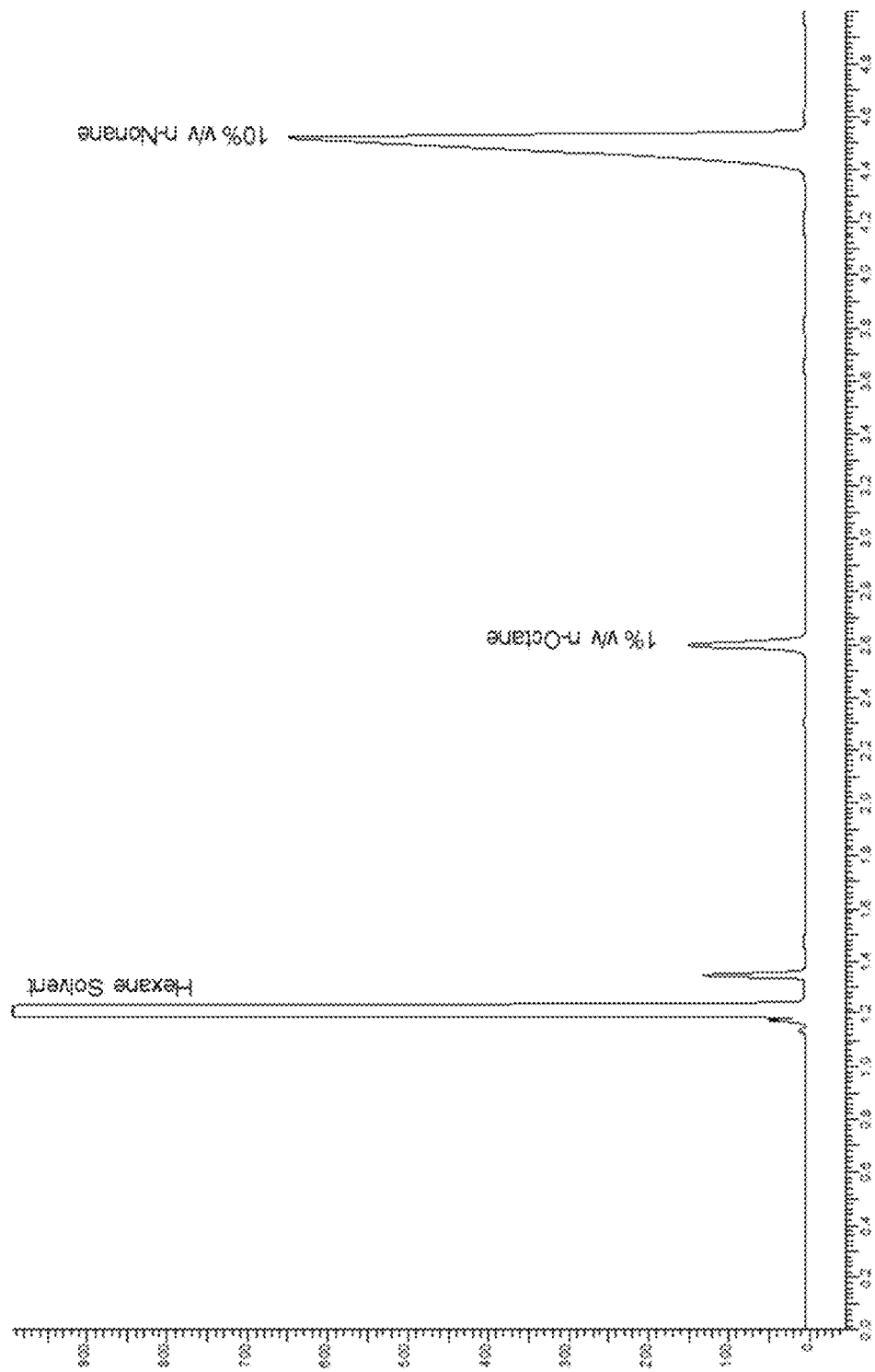
FIG. 21 is a chromatogram showing three analytes, in accordance with certain examples.
Figure 22:
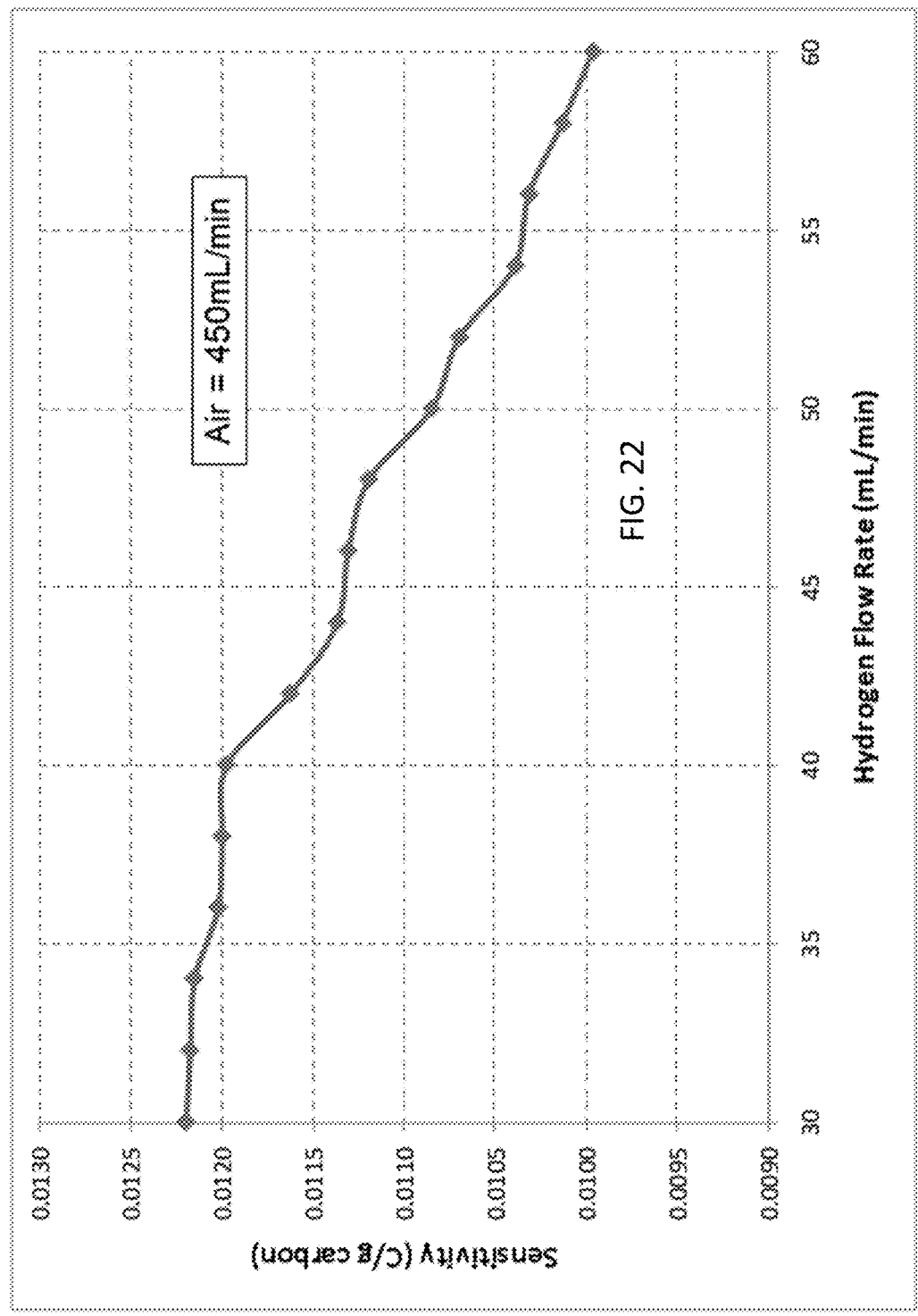
FIG. 22 is graph showing FID sensitivity where air is supplied to the FID, in accordance with certain examples.
Figure 24:
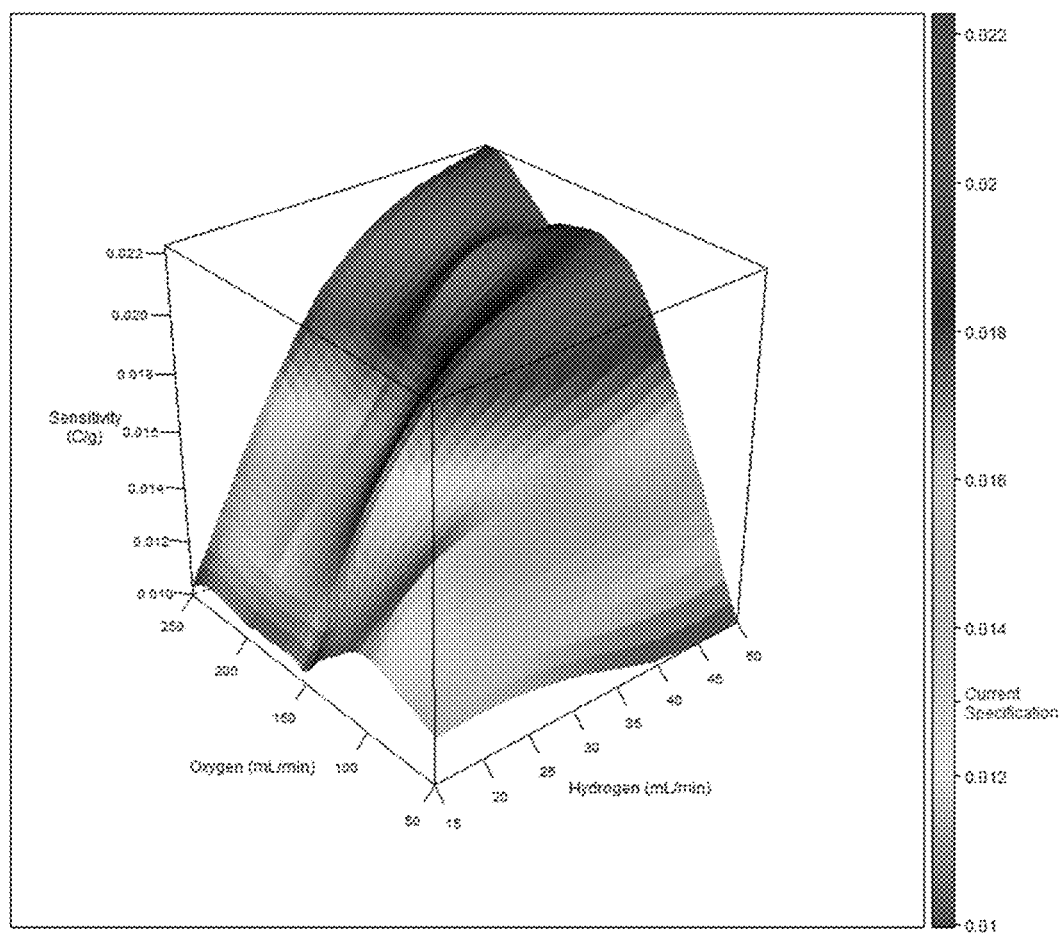
FIGS. 24-28 are various graphs from testing of systems, in accordance with certain examples.

Feasibility experiments were performed to test whether a standard flame ionization detector (from a Clarus GC commercially available from PerkinElmer, Inc.) would function with oxygen rather than a conventional air supply. An IQ/OQ test mixture was used. The detected peaks (in order from left to right) of hexane, n-octane and n-nonane are shown in FIG. 21. The sensitivity of the FID detector (where air is supplied to the FID) as a function of hydrogen carrier gas flow rate is shown in FIG. 22. The sensitivity of the FID detector (for n-tridecane where oxygen is supplied to the FID) as a function of hydrogen carrier gas flow rate is shown in FIG. 23. A comparison of the values shows that the sensitivity of the FID in the presence of oxygen generally falls below an acceptable upper sensitivity limit (0.013-0.014 Coulombs/gram carbon). A graph showing the sensitivity of the FID with changes in oxygen flow rates is shown in FIG. 24.

Figure 25:
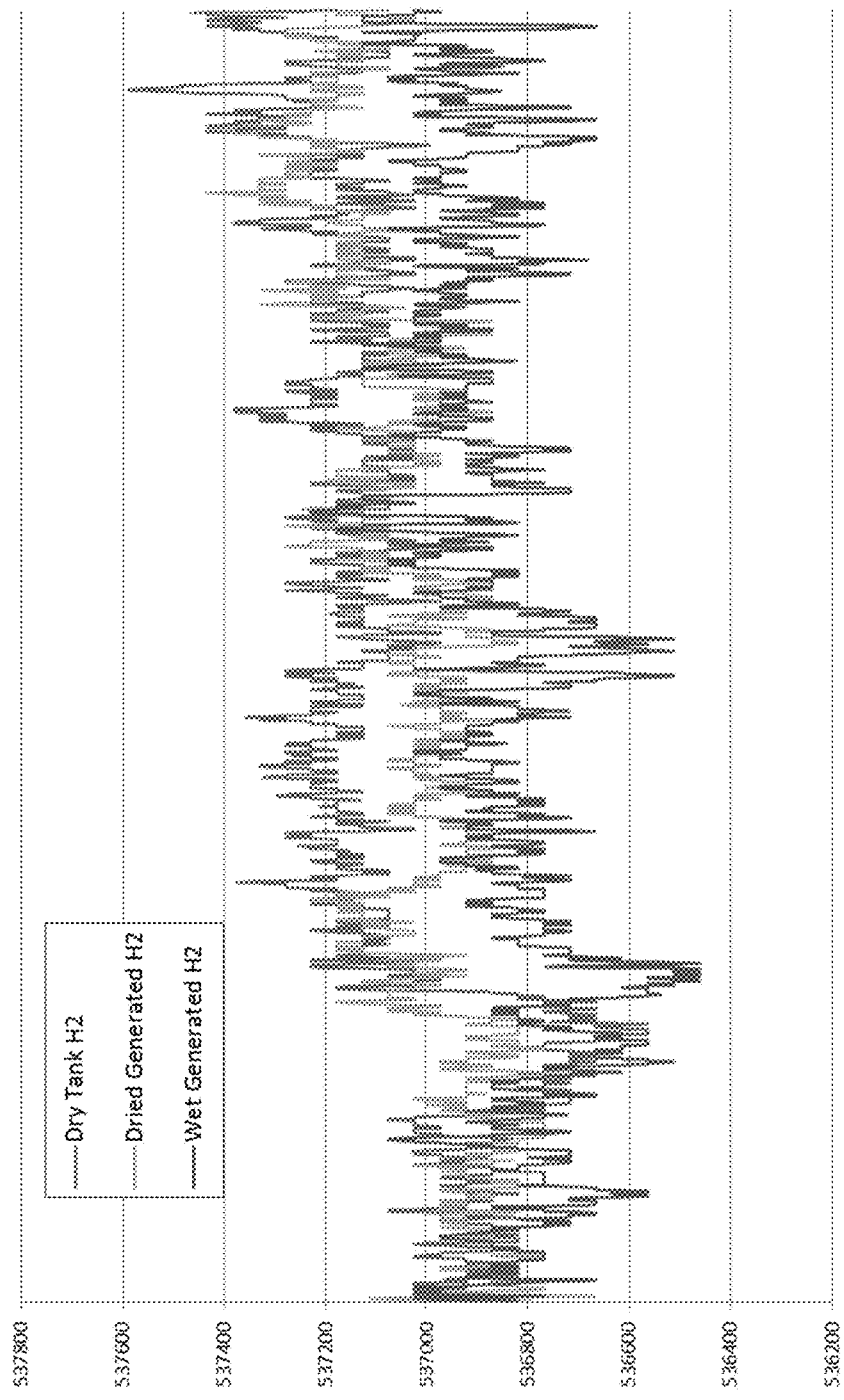

A noise signal from three FID hydrogen sources was also measured and is shown in FIG. 25.

Example 5

Figure 26:
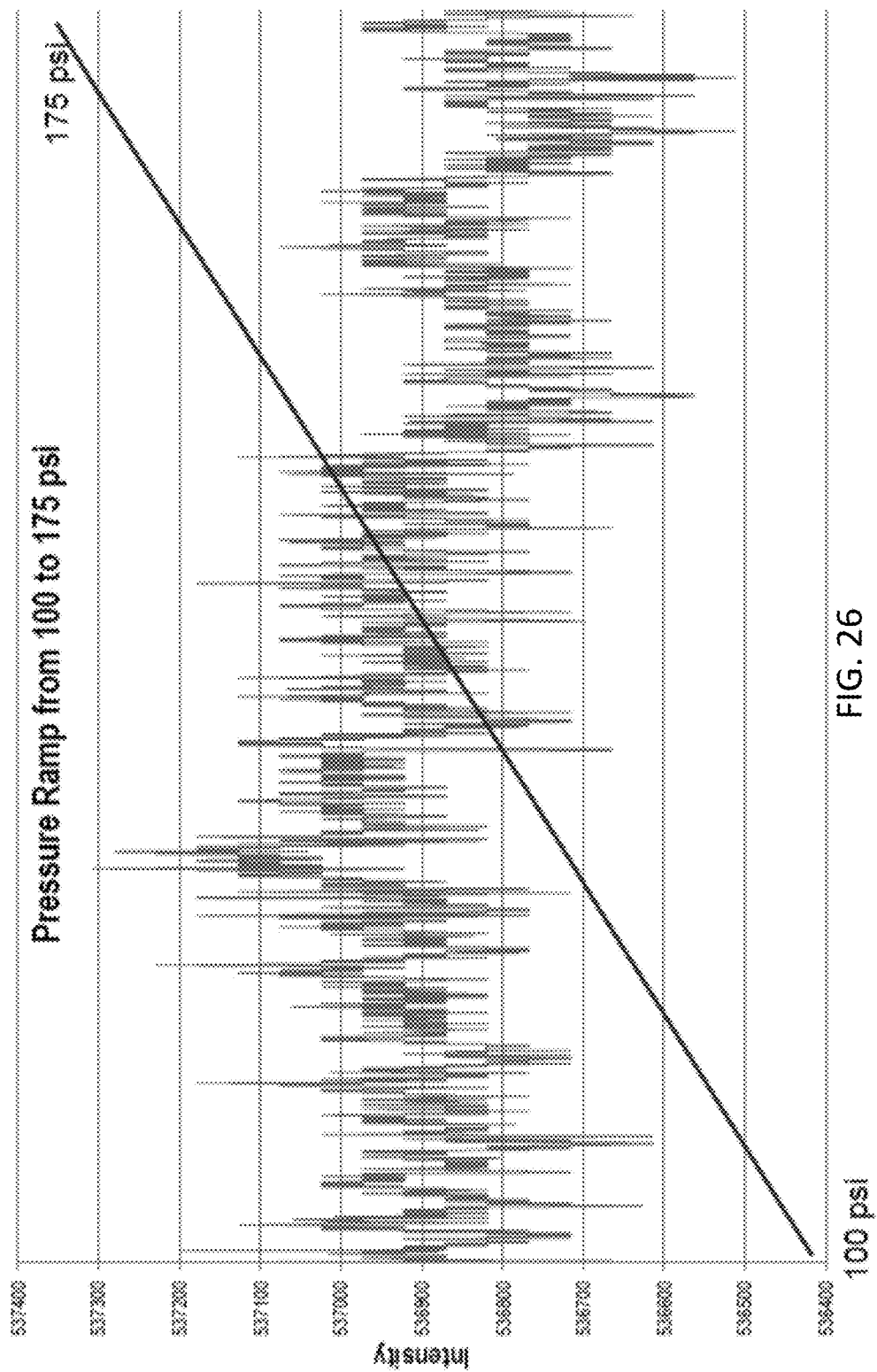
Figure 27:
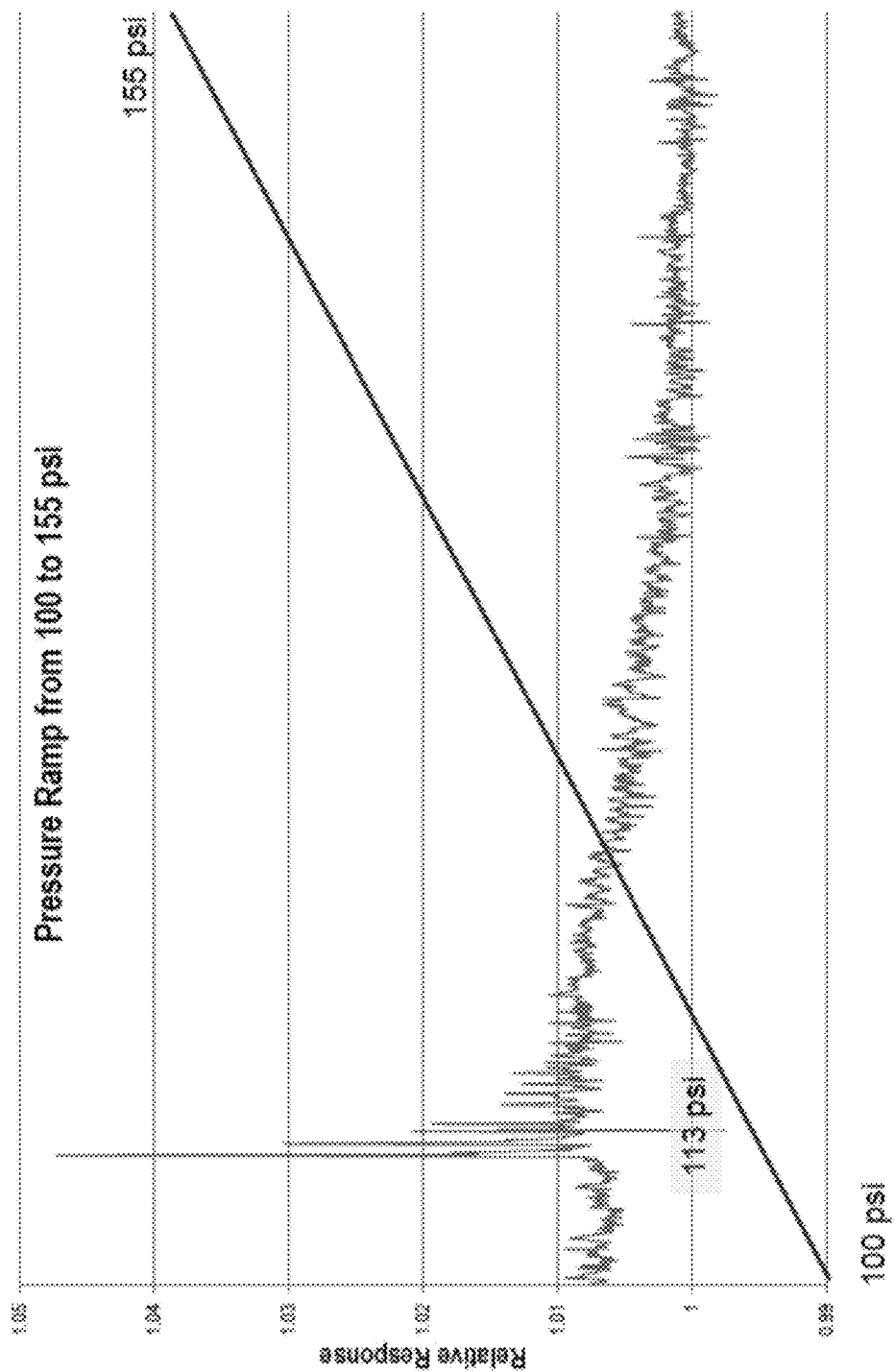
Figure 28:
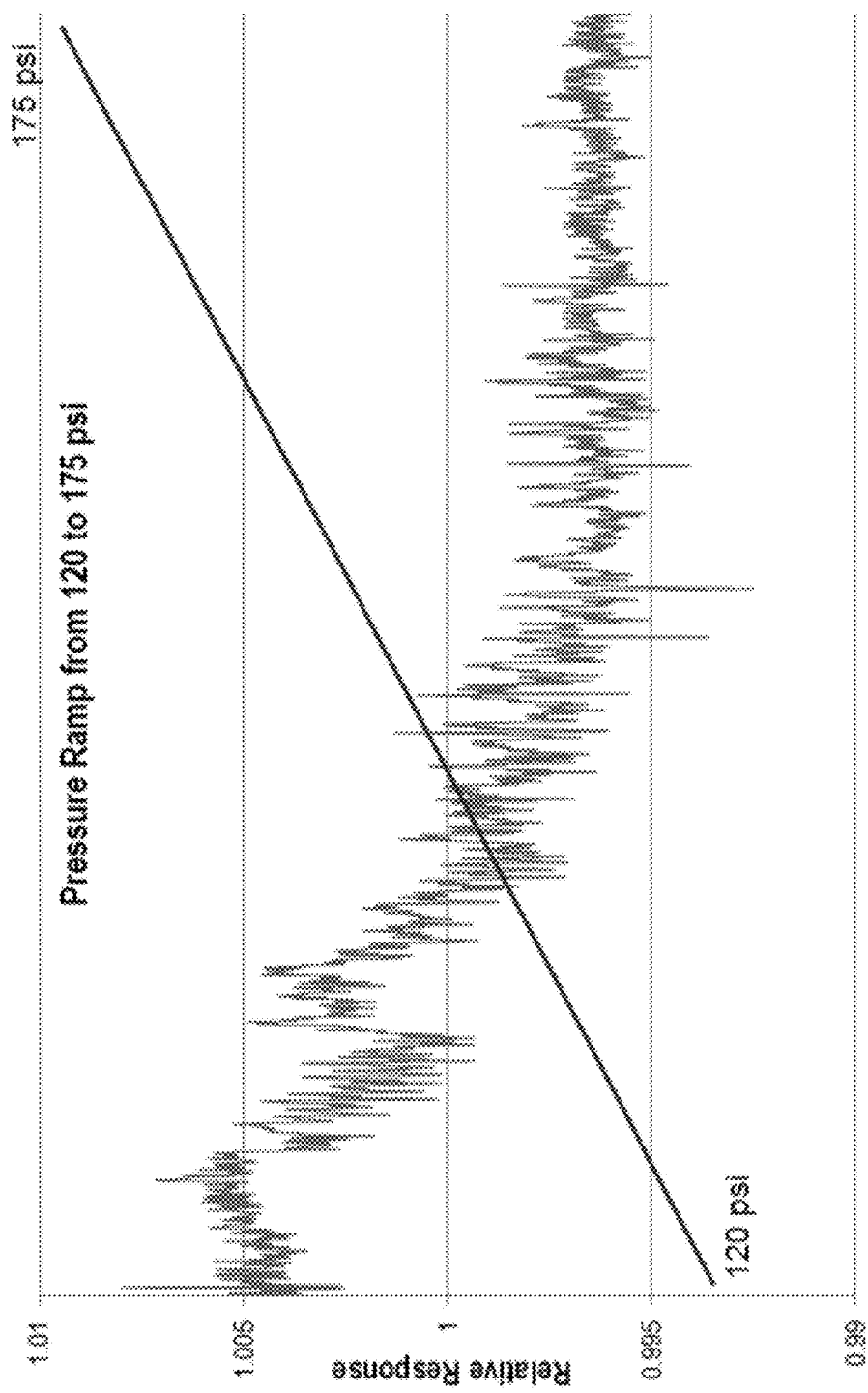

The response and noise was measured as the source pressure was changed to simulate a filling pressure tank. This affects the design of the system by adding a buffer tank to alleviate high momentary hydrogen need. The source pressure, up stream of the regulator (set to 100 psi), was increased over the course of the run and noise and response were measured (in separate experiments). FIGS. 26 and 27 show the noise and the methane response respectively as the pressure was gradually increased from 100 psi to 175 psi (FIG. 26) or 100 psi to 155 psi (FIG. 27) to simulate a filling pressure tank. FIG. 28 shows the response starting at 120 psi and ending at 175 psi. The noise is not substantially affected by pressure change, but the response has a significant response at about 113 psi. The response was representative of a constant flow of methane into the carrier gas at the injector port.

The hydrogen generator worked well and could replace the hydrogen gas tank, as well as the helium gas tank for the carrier gas. Pressure up-stream of the external regulator can be maintained sufficiently high to permit for a pressure drop across the regulator. The buffer tank can be designed using estimates of the gas flow and maximum pressure of the generator.

When introducing elements of the aspects, embodiments and examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A gas chromatography system comprising a housing comprising an injector and an internal gas generator inside the housing, wherein the injector is configured to fluidically couple to a gas chromatography column within the housing through a first internal fluid line, wherein the internal gas generator is configured to fluidically couple to the gas chromatography column through a second fluid line, wherein the internal gas generator is configured to generate hydrogen gas, and wherein the gas chromatography system is further configured to use the generated hydrogen gas from the internal gas generator as a carrier gas to separate analyte species using the gas chromatography column without using any externally introduced carrier gas.

2. The gas chromatography system of claim 1, in which the system is further configured to use the generated hydrogen gas as a fuel for a detector of the gas chromatography system or is further configured to use the generated hydrogen gas as a makeup gas for a detector of the gas chromatography system.

3. The gas chromatography system of claim 2, in which the gas chromatography system is configured to generate oxygen gas concurrently with generation of the hydrogen gas.

4. The gas chromatography system of claim 1, in which the internal gas generator comprises an electrolysis device.

5. The gas chromatography system of claim 4, in which the electrolysis device is fluidically coupled to a water reservoir.

6. The gas chromatography system of claim 5, in which the electrolysis device is configured to generate the hydrogen gas and oxygen gas from electrolysis of water received from the water reservoir.

7. The gas chromatography system of claim 6, in which the electrolysis device comprises an anode, a cathode and a membrane between the anode and the cathode.

8. The gas chromatography system of claim 7, further comprising a gas reservoir fluidically coupled to the internal gas generator and configured to store at least one gas produced by the internal gas generator.

9. The gas chromatography system of claim 7, further comprising a detector fluidically coupled to the internal gas generator, the detector configured to receive gas from the internal gas generator and use the received gas to detect separated analyte species received from the gas chromatography column.

10. A gas chromatography system comprising:
a housing comprising an injector; and
a plurality of gas generators comprising at least one internal gas generator inside the housing,
wherein the injector is configured to fluidically couple to a gas chromatography column within the housing through a first internal fluid line,
wherein the at least one internal gas generator is configured to fluidically couple to the gas chromatography column through a second fluid line,
wherein the at least one internal gas generator is configured to generate hydrogen gas,
wherein the gas chromatography system is configured to use the generated hydrogen from the at least one internal gas generator as a carrier gas for introduction and separation of analyte species,
wherein the gas system chromatography system further comprises a detector and is further configured to use the generated hydrogen gas from the at least one has generator as a makeup gas for the detector, in which the detector is a flame ionization detector or a flame photometric detector, in which each of the plurality of gas generators is independently controlled to regulate pressure in the gas chromatography system, or in which the gas chromatography system is configured to control the pressure in the gas chromatography system without using a pneumatic pressure controller.

11. A gas chromatography system configured to separate analyte species using a gas chromatography column within a housing of the gas chromatography system, the gas chromatography system comprising:
an injector coupled to the housing of the gas chromatography system, the injector configured to fluidically couple to the gas chromatography column to provide sample comprising the analyte species from the injector to the gas chromatography column;
an internal gas generator within the housing of the gas chromatography system and configured to fluidically couple to each of the injector and the gas chromatography column to provide carrier gas generated by the internal gas generator to the injector and to the gas chromatography column to introduce the sample into the gas chromatography column and separate analyte species in the sample without using an externally introduced carrier gas; and
a detector configured to fluidically couple to the gas chromatography column to receive separated analyte species from the gas chromatography column.

12. The gas chromatography system of claim 11, further comprising a second internal gas generator within the housing of the gas chromatography system and configured to fluidically couple to at least one of the injector and the gas chromatography column.

13. The gas chromatography system of claim 12, in which the detector is configured to provide a flame or comprises a wire filament.

14. The gas chromatography system of claim 11, further comprising a gas reservoir fluidically coupled to the internal gas generator and configured to store at least one gas generated by the internal gas generator.

15. The gas chromatography system of claim 11, in which the system is configured to control pressure within the system without using a pneumatic pressure controller.

16. The gas chromatography system of claim 11, further comprising an inlet configured to introduce a second carrier gas that is different from the carrier gas generated by the internal gas generator.

17. The gas chromatography system of claim 11, in which the internal gas generator within the housing of the gas chromatography system comprises an electrolysis cell configured to electrolyze water.

18. A gas chromatography system configured to separate analyte species using a chromatography column within a housing of the gas chromatography system, the gas chromatography system comprising:
an injector coupled to the housing of the gas chromatography system, the injector configured to fluidically couple to the chromatography column to provide sample comprising the analyte species from the injector to the chromatography column;

an internal gas generator within the housing of the gas chromatography system and configured to fluidically couple to the injector and the chromatography column to provide carrier gas generated by the internal gas generator to the injector and to the chromatography column; and a detector configured to fluidically couple to the chromatography column to receive separated analyte species from the chromatography column, the system further comprising a gas reservoir fluidically coupled to the internal gas generator and configured to store at least one gas generated by the internal gas generator, the system further comprising a second gas reservoir fluidically coupled to the internal gas generator, in which the gas reservoir receives a first gas from the internal gas generator and the second gas reservoir receives a second gas from the internal gas generator.

19. The gas chromatography system of claim 18, in which the detector is a thermal conductivity detector or a discharge ionization detector.

20. The gas chromatography system of claim 18, wherein the detector is a flame ionization detector, a flame photometric detector, a thermal conductivity detector or a discharge ionization detector.

21. The gas chromatography system of claim 18, wherein the internal gas generator comprises an electrolysis device.

22. The gas chromatography system of claim 21, wherein the electrolysis device comprises an anode, a cathode and a membrane between the anode and the cathode.

23. A gas chromatography system configured to separate analyte species using a chromatography column within a housing of the gas chromatography system, the gas chromatography system comprising:

an injector coupled to the housing of the gas chromatography system, the injector configured to fluidically couple to the chromatography column to provide sample comprising the analyte species from the injector to the chromatography column;

an internal gas generator within the housing of the gas chromatography system and configured to fluidically couple to the injector and the chromatography column to provide carrier gas generated by the internal gas generator to the injector and to the chromatography column; and a detector configured to fluidically couple to the chromatography column to receive separated analyte species from the chromatography column, in which the internal gas generator within the housing of the gas chromatography system comprises an electrolysis cell configured to electrolyze water to generate the hydrogen and the oxygen, the system further comprising a first port configured to receive the generated hydrogen and provide the generated hydrogen to a chromatography column and comprising a second port configured to receive the generated oxygen and provide the generated oxygen to the detector.

24. The gas chromatography system of claim 23, wherein the detector is a flame ionization detector, a flame photometric detector, a thermal conductivity detector or a discharge ionization detector.

25. The gas chromatography system of claim 23, wherein the internal gas generator comprises an electrolysis device.

26. The gas chromatography system of claim 25, wherein the electrolysis device comprises an anode, a cathode and a membrane between the anode and the cathode.

* * * * *